US010628901B1

(12) United States Patent
Ancona et al.

(10) Patent No.: US 10,628,901 B1
(45) Date of Patent: Apr. 21, 2020

(54) INFORMATION MANAGEMENT SYSTEM FOR CONNECTED LEARNING CENTERS

(71) Applicant: Accenture Global Solutions Limited, Dublin (IE)

(72) Inventors: Matthew J. Ancona, Bloomingdale, IN (US); Bryan Michael McCart, Elburn, IL (US); Dana A. Koch, St. Charles, IL (US); Jeffrey T. Vinkler, Elgin, IL (US); Sudhamayee Sampath, Bangalore (IN); Rahul Varma, New York, NY (US); Parag Pande, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 213 days.

(21) Appl. No.: 15/274,750

(22) Filed: Sep. 23, 2016

(51) Int. Cl.
| G09B 5/00 | (2006.01) |
| G06Q 50/20 | (2012.01) |
| G06Q 10/10 | (2012.01) |
| G09B 5/06 | (2006.01) |
| G09B 5/12 | (2006.01) |
| G09B 7/00 | (2006.01) |
| G06F 16/951 | (2019.01) |
| H04W 4/33 | (2018.01) |
| H04W 88/02 | (2009.01) |

(52) U.S. Cl.
CPC ......... *G06Q 50/205* (2013.01); *G06F 16/951* (2019.01); *G06Q 10/1091* (2013.01); *G09B 5/065* (2013.01); *G09B 5/12* (2013.01); *G09B 7/00* (2013.01); *H04W 4/33* (2018.02); *H04W 88/02* (2013.01)

(58) Field of Classification Search
CPC .......... G09B 5/00; G09B 19/00; G06Q 50/20; G06Q 50/205; G06Q 50/2053
See application file for complete search history.

(56) References Cited

U.S. PATENT DOCUMENTS

| 9,123,031 | B2 | 9/2015 | Marshall et al. | |
| 9,432,808 | B1* | 8/2016 | Reyes | G06Q 50/205 |
| 2002/0110795 | A1* | 8/2002 | Lemchen | G09B 7/00 |
| | | | | 434/350 |
| 2008/0201634 | A1* | 8/2008 | Gibb | G06F 3/0484 |
| | | | | 715/256 |
| 2008/0224853 | A1 | 9/2008 | Patel | |
| 2010/0279266 | A1* | 11/2010 | Laine | G06Q 10/10 |
| | | | | 434/350 |

(Continued)

Primary Examiner — Peter R Egloff
(74) Attorney, Agent, or Firm — Harrity & Harrity, LLP

(57) ABSTRACT

A device may receive information regarding one or more client devices being utilized at a connected learning center. The device may receive information regarding one or more training courses, one or more users of the one or more client devices, and the one or more users. The user interface may provide information regarding a particular training course, of the one or more training courses, that a particular user is attending. The particular user may be determined to be attending the particular training course based on the information regarding the one or more client devices, obtained by a particular sensor of a plurality of sensors, indicating that a particular client device is located within a classroom of the connected learning center in which the particular training course is being provided. The device may provide the user interface for display.

20 Claims, 13 Drawing Sheets

(56) References Cited

U.S. PATENT DOCUMENTS

| | | | |
|---|---|---|---|
| 2013/0004929 A1* | 1/2013 | Otwell | G09B 5/00 434/350 |
| 2015/0193739 A1 | 7/2015 | Min et al. | |
| 2018/0046470 A1* | 2/2018 | de Oliveira | G06F 9/451 |

* cited by examiner

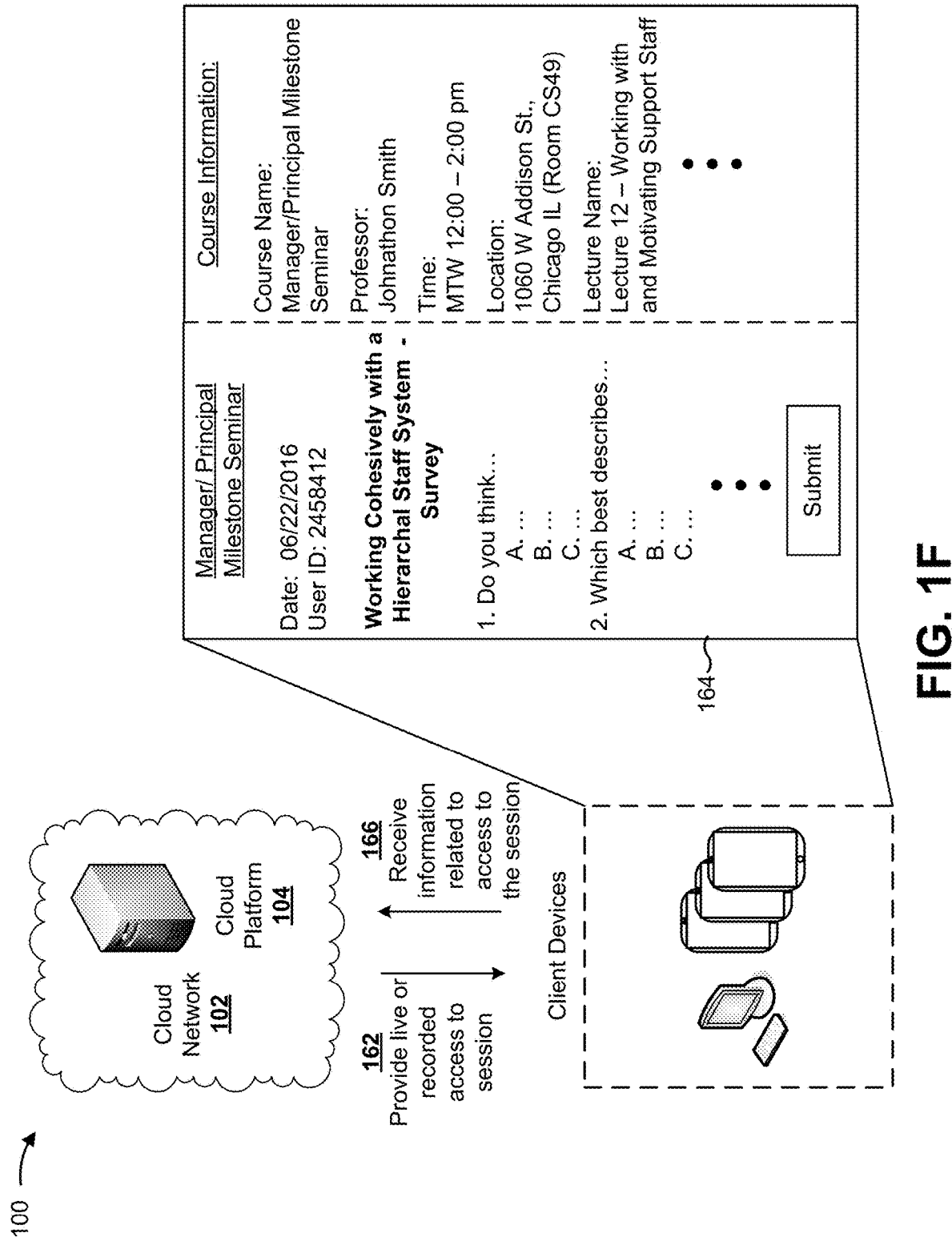

INFORMATION MANAGEMENT SYSTEM FOR CONNECTED LEARNING CENTERS

BACKGROUND

A company may host education and training courses for interested attendees. For example, the company may host training courses for the attendees in a learning center (e.g., a conference center, a hotel, or an educational campus) to train the attendees. The education and training courses may relate to a particular subject. For example, the company may offer web development training courses, client management training courses, financial analysis training courses, or the like. At the training courses, the attendees may receive a course schedule document identifying courses in which the attendees may enroll and a course syllabus document indicating required course materials and/or a timeline for a particular course.

SUMMARY

According to some possible implementations, a device may include one or more processors. The one or more processors may receive, from a plurality of sensors associated with a connected learning center, information regarding one or more client devices being utilized at the connected learning center. The one or more processors may receive, from a first repository, information regarding one or more training courses associated with the connected learning center. The one or more processors may receive, from a second repository, information regarding one or more users of the one or more client devices. The one or more processors may generate a user interface using the information regarding the one or more client devices, the information regarding the one or more training courses, and the information regarding the one or more users. The user interface may provide, to a particular user, of the one or more users, of a particular client device, of the one or more client devices, information regarding a particular training course, of the one or more training courses, that the particular user is attending. The particular user may be determined to be attending the particular training course based on the information regarding the one or more client devices, obtained by a particular sensor of the plurality of sensors, indicating that the particular client device is located within a classroom of the connected learning center in which the particular training course is being provided. The one or more processors may provide the user interface for display.

According to some possible implementations, a method may include determining, by a system that includes one or more processors, a first set of attendees of a training course at a connected learning center based on sensor data identifying a first set of client devices located within a classroom associated with the training course. The first set of client devices may be associated with a first set of attendees. The sensor data may be obtained from a sensor located at the classroom and communicatively connected to the first set of client devices. The method may include storing, by the system, information identifying the first set of attendees. The method may include providing, by the system, a real-time video of the training course at the connected learning center to a second set of client devices based on receiving real-time video from a camera device located within the classroom. The second set of client devices may be associated with a second set of attendees. The second set of client devices not being located within the classroom. The method may include storing, by the system, information identifying the second set of attendees. The method may include providing, by the system, a user interface including information regarding the training course. The information regarding the training course may include information identifying the first set of attendees and the second set of attendees.

According to some possible implementations, a non-transitory computer-readable medium may store one or more instructions that, when executed by one or more processors, may cause the one or more processors to generate a user interface based on information regarding a connected learning center, a set of courses at the connected learning center, and a set of users signed up for the courses. The one or more instructions, when executed by one or more processors, may cause the one or more processors to provide, for display via a client device utilized by a particular user of the set of users, the user interface. The one or more instructions, when executed by one or more processors, may cause the one or more processors to detect that the client device is within a threshold proximity to a display device of the connected learning center. The one or more instructions, when executed by one or more processors, may cause the one or more processors to cause a portion of the information regarding the set of courses at the connected learning center to be provided for display via the display device. The portion of the information may be selected based on user information regarding the particular user. The one or more instructions, when executed by one or more processors, may cause the one or more processors to detect that the client device is within a threshold proximity of a particular classroom associated with a particular course of the set of courses. The one or more instructions, when executed by one or more processors, may cause the one or more processors to update the user interface based on detecting that the client device is within the threshold proximity of the particular classroom. The one or more instructions, when executed by one or more processors, may cause the one or more processors to update one or more other user interfaces provided to one or more other client devices used by one or more other users based on detecting that the client device is within the threshold proximity of the particular classroom.

BRIEF DESCRIPTION OF THE DRAWINGS

FIGS. 1A-1I are diagrams of an overview of an example implementation described herein;

DETAILED DESCRIPTION

The following detailed description of example implementations refers to the accompanying drawings. The same reference numbers in different drawings may identify the same or similar elements.

A company may host education and training courses. For example, the company may hold a course in a classroom of a learning center (e.g., a conference center, a college campus, or a private training campus). Employees of the company may receive training and may be provided an opportunity to network by attending the course at the classroom. The company may distribute a set of documents to the employees. For example, the company may assign a staff member to perform a check-in of employees at the learning center, register employees for courses, and provide employees with a welcome packet that includes a course schedule and a course syllabus for courses to which the employees are registered.

However, a user of the learning center (e.g., an employee of a company, a conference attendee, or a student) may lack information about course offerings, course locations, course times, or the like. Moreover, an attendee may desire to attend training courses, but may be unable to be physically present in the classroom. Furthermore, trivial tasks, such as checking in conference attendees, taking attendance at courses or seminars, printing and distributing course materials, or the like, may waste a staff member's time, an instructor's time, and/or an attendee's time. Additionally, learning centers may include large groups of attendees attending course sessions in multiple rooms, thereby making it difficult for individual attendees to network with colleagues at the learning center.

Implementations, described herein, may provide an user interface for a connected learning center via a cloud platform. In this way, the cloud platform may provide, in a set of user interfaces, access to information relating to the connected learning center. Moreover, the cloud platform reduces a utilization of a classroom time, a quantity of required staff, a cost of office materials, or the like relative to when the company is required to provide additional staff and office materials to aid an instructor in trivial tasks. Furthermore, the cloud platform improves user experience and networking for in-person attendees and remote attendees of the connected learning center relative to a learning center in which an in-person attendee is only able to network with other in-person attendees in the same classroom. Additionally, the cloud platform combines information into a single user interface, thereby reducing a utilization of computing resources and/or network resources relative to a user being required to manually search for and obtain relevant information, such as course materials, networking information, nearby attraction information, hotel reservation information, directions, or the like.

Figure 1A:
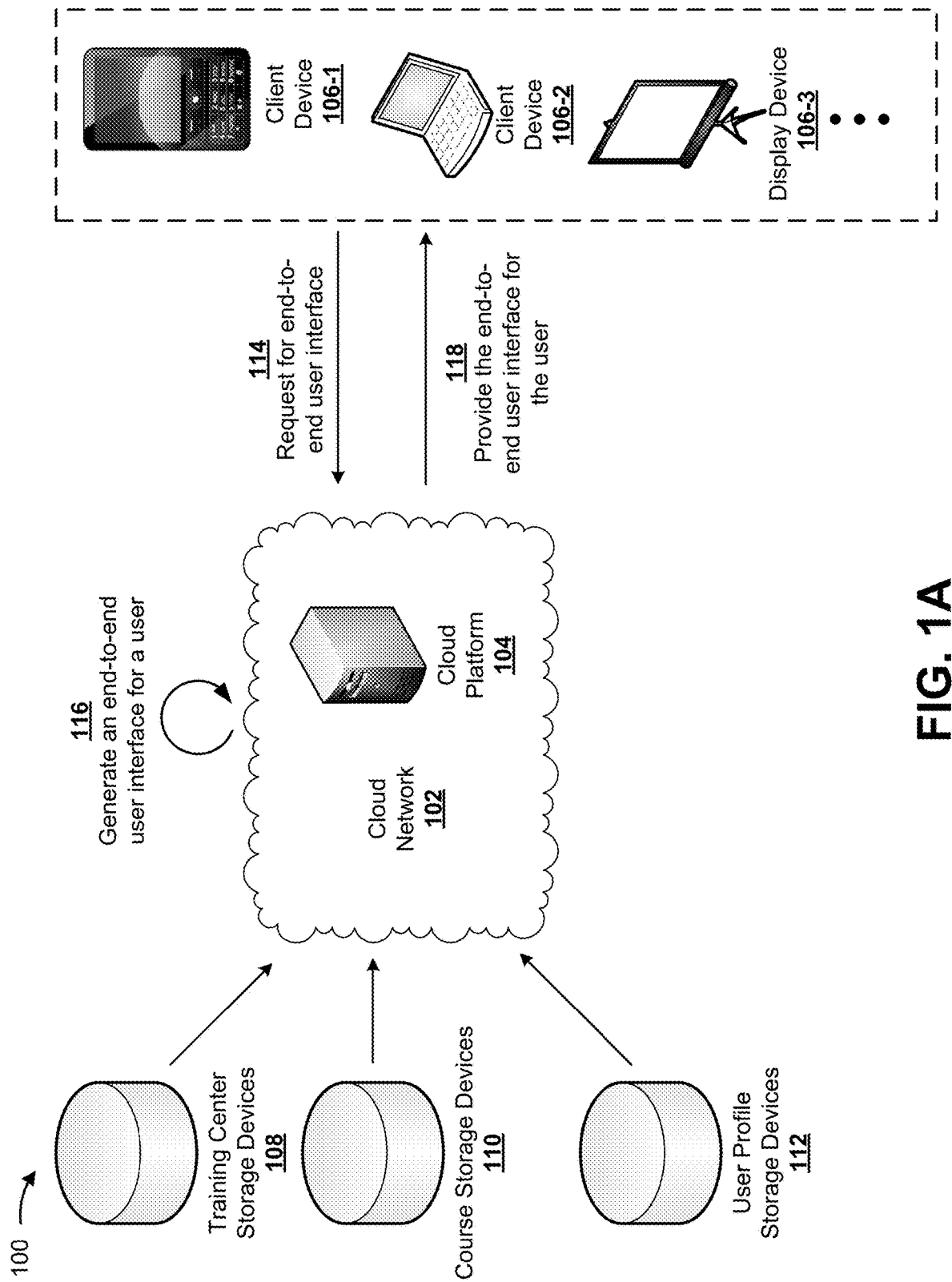

FIGS. 1A-1I are diagrams of an overview of an example implementation 100 described herein. As shown in FIG. 1A, example implementation 100 may include cloud network 102, cloud platform 104, a set of devices 106 (e.g., a client device 106-1, a client device 106-2, a display device 106-3, a connected conference attendee badge (e.g., a Bluetooth badge, a radio-frequency identification (RFID) badge, a near field communication (NFC) badge, or the like), or another type of network-connected device that may be utilized in a connected learning center), training center storage device 108, course storage device 110, and user profile storage device 112.

As further shown in FIG. 1A, and by reference number 114, cloud platform 104 may receive a request from a particular device 106 for information relating to a connected learning center. For example, when client device 106-1 is utilized by a conference attendee located within the connected learning center, client device 106-1 may request a user interface to provide information relating to courses at the connected learning center, attendees at the connected learning center, or the like. In another example, cloud platform 104 may determine to generate a user interface for the connected learning center without receiving a request for information from a device 106. For example, cloud platform 104 may provide information for display via display device 106-3 to provide information to users at the connected learning center (e.g., without receiving a request from display device 106-3).

As further shown in FIG. 1A, and by reference number 116, cloud platform 104 may collect information from one or more data structures, and may combine the information to generate the user interface. For example, cloud platform 104 may obtain, from training center storage device 108, connected learning center information including information identifying a floor plan of the connected learning center, a location of the connected learning center, sensor data identifying a location of a set of devices 106 being utilized in the connected learning center, or the like.

Similarly, cloud platform 104 may obtain, from course storage device 110, course information relating to a course being offered at the connected learning center or a particular session of a particular course, such as information identifying a course syllabus, a course instructor, a set of attendees of a session of a course, an amount of available seats in a session of a course, or the like. A session of a course may refer to a particular offering of a course. For example, a particular course may be offered in a first session (e.g., on a first set of dates, at a first time, or in a first location) and in a second session (e.g., on a second set of dates, at a second time, or in a second location).

Similarly, cloud platform 104 may obtain, from user profile storage device 112, user information relating to a set of users (e.g., in-person attendees or remote attendees) of courses offered at the connected learning center, such as a set of course preferences, a social networking profile, a response to a questionnaire, or the like.

In another example, cloud platform 104 may obtain other information, such as weather information, flight information, restaurant information, hotel information, information identifying attractions near the connected learning center, or the like.

Cloud platform 104 may combine the information from the one or more storage devices into a set of views of the user interface. For example, cloud platform 104 may generate a first view of the user interface for client device 106-1 when client device 106-1 is utilized by an in-person user of the connected learning center and a second view of the user interface for client device 106-2 when client device 106-2 is utilized by a remote user of the connected learning center. Additionally, or alternatively, cloud platform 104 may generate a particular view of the user interface for display via display device 106-3, such as including information pertaining to multiple users of the connected learning center, including information pertaining to a particular user determined to be within a particular proximity of display device 106-3, information pertaining to a course being offered in a room in which display device 106-3 is located, or the like.

As further shown in FIG. 1A, and by reference number 118, cloud platform 104 may provide the user interface to one or more devices 106. For example, cloud platform 104 may cause a first view of the user interface, including information identifying directions from a location of a user to a location of a classroom, to be provided for display via client device 106-1. Similarly, cloud platform 104 may cause a second view of the user interface, including a social network profile of a colleague of a user of client device 106-2, to be provided for display via client device 106-2. Similarly, cloud platform 104 may cause a third view of the user interface, including information indicating a location of a meeting, information identifying a flight delay, or the like, to be provided for display to multiple users via display device 106-3.

Figure 1B:
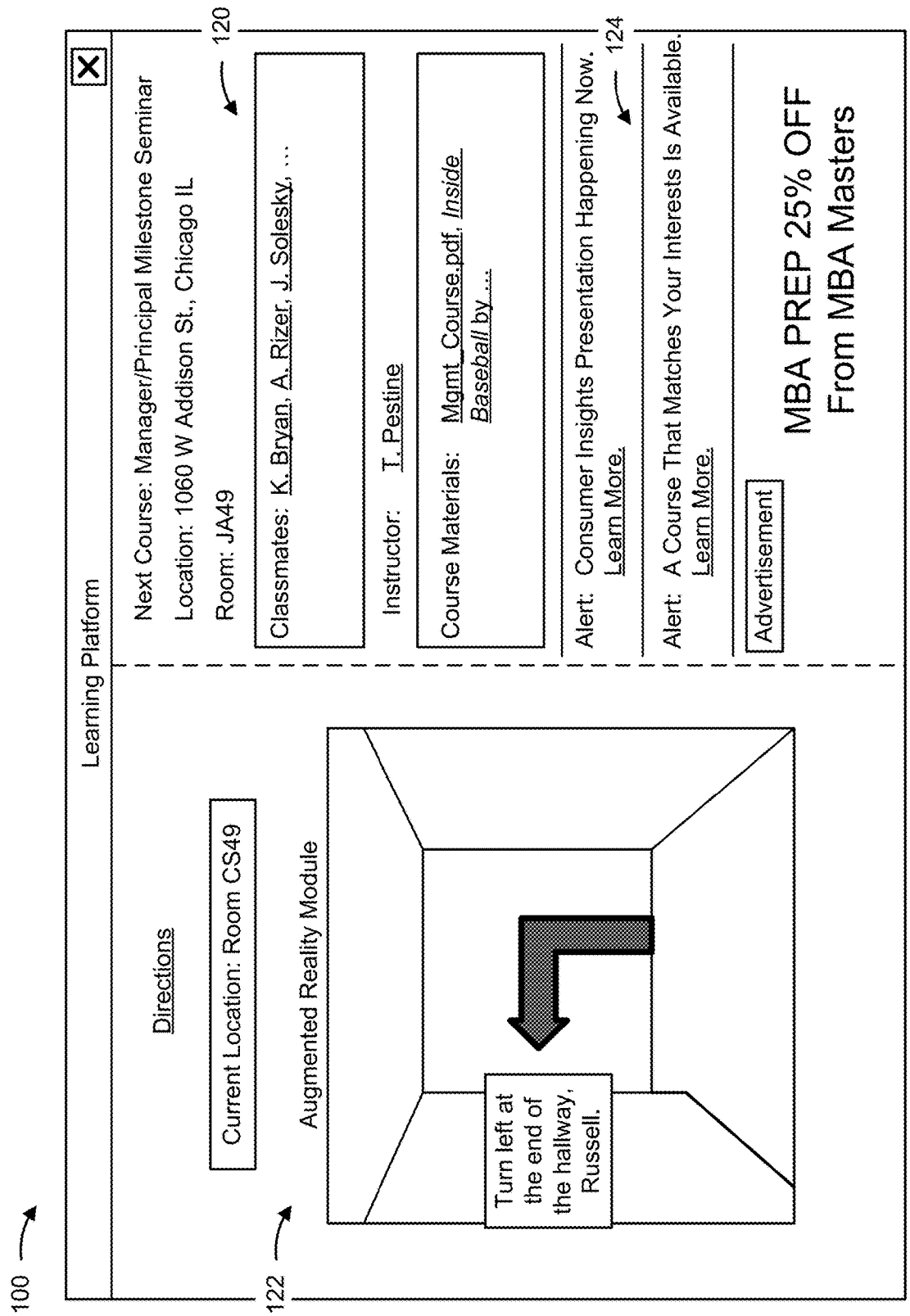

As shown in FIG. 1B, based on cloud platform 104 providing the user interface, a client device (e.g., client device 106-1) may provide the first view of the user interface for display. As shown by reference number 120, the client device may provide, in a first portion of the first view of the user interface, course information. For example, the client device may provide information relating to the next course that an attendee is to attend, such as information identifying a building location, a room number, a class list of classmates, an instructor, a set of course materials, or the like. Based on detecting a user interaction with the user interface (e.g., a selection of a particular name in the class list), the client device may provide social networking information regarding a classmate and/or a chat functionality to permit the client device to transmit a message to another client device utilized by the classmate for display via the other client device. In this way, by automatically providing networking information and communication functionality in a user interface, cloud platform 104 reduces a quantity of user interactions with the user interface to obtain the networking information and to use the communication functionality, thereby reducing a utilization of processing resources relative to requiring a user to manually open multiple applications to locate the networking information and to communicate with another user.

In some implementations, the information regarding the next course may be determined based on stored registration information or received sensor information. For example, cloud platform 104 may receive a class list document, may distribute the class list document for display via the client device, and may subsequently update the class list document based on detecting a set of client devices (e.g., associated with a set of users) being utilized in a particular classroom. In this way, cloud platform 104 obviates a need to distribute updated class list information via printed documents by automatically obtaining and updating class list information provided via the user interface, thereby reducing a utilization of processing resources relative to requiring a user to manually search for and obtain the class list information.

As further shown in FIG. 1B, and by reference number 122, the client device may provide wayfinding directions for display via the first view of the user interface. For example, cloud platform 104 may generate a set of wayfinding directions to direct an attendee from a particular location to a particular classroom of a course for which the attendee is to attend, and may cause the set of wayfinding directions to be overlaid on an image captured by the client device (e.g., to provide an augmented reality functionality). In this case, cloud platform 104 may utilize a real-time or near real-time image captured by a client device and location information regarding the client device to identify, for example, a turn for the user, and cause an icon identifying the turn to be displayed in the real-time or near real-time image in a user interface. Additionally, or alternatively, cloud platform 104 may cause a display device (e.g., display device 106-3) located in a hallway of the connected learning center to provide a view of the user interface including customized information to direct the user to the particular classroom based on detecting that the client device of the user is within a particular proximity of the display device.

As further shown in FIG. 1B, and by reference number 124, the client device may provide one or more alerts for display via the first view of the user interface. For example, the client device may provide an alert indicating that a presentation, which is associated with a threshold likelihood of being of interest to a user of the client device, is occurring. Similarly, the client device may provide an alert identifying an upcoming course that may be of interest to the user. Similarly, the client device may provide an advertisement alert identifying a product that is determined to be of interest to the user. In this case, cloud platform 104 may select and provide the one or more alerts based on user information, user preferences, user qualifications, or the like. For example, based on cloud platform 104 determining that the user of the client device is an undergraduate business student (e.g., based on a social networking profile), cloud platform 104 may cause an advertisement for a graduate business education preparation course to be provided for display via the client device. In another example, cloud platform 104 may cause other information to be provided for display, such as a set of laboratory hours for a laboratory at the connected learning center, a restaurant menu for a restaurant near the connected learning center, a food ordering module to permit a user to order food for delivery to the connected learning center, or the like based on receiving information from training center storage device 108, course storage device 110, and/or user profile storage device 112. In this way, cloud platform 104 dynamically provides information for display via displays or a learning center.

Figure 1C:
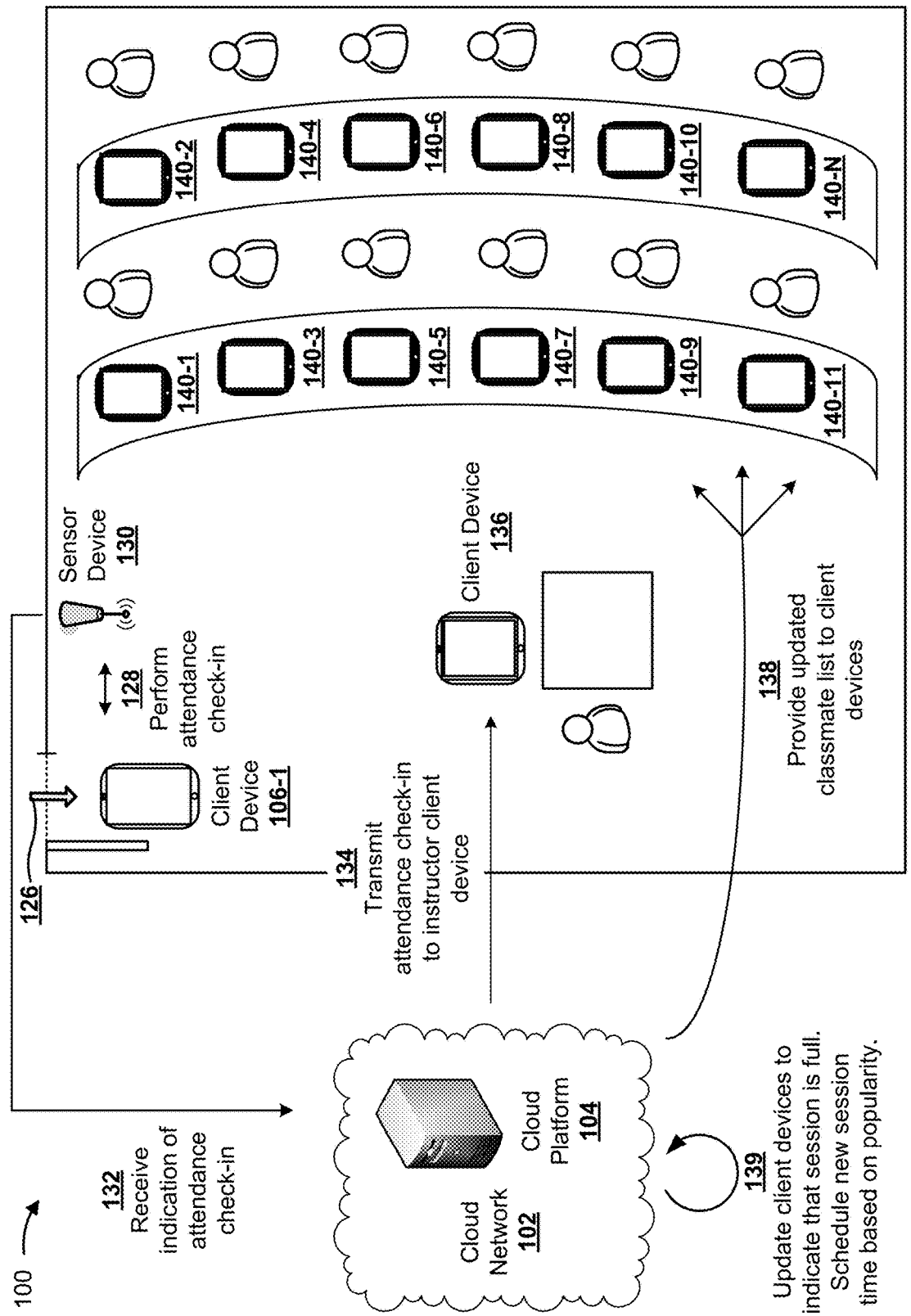

As shown in FIG. 1C, and by reference number 126, client device 106-1 may be moved into a classroom by an attendee (e.g., based on the wayfinding directions identifying a location of the classroom). As shown by reference number 128, client device 106-1 and sensor device 130 may perform attendance check-in for the attendee. For example, client device 106 may detect a Bluetooth beacon provided by sensor device 130, and may communicate with sensor device 130 based on detecting the Bluetooth beacon. In another example, sensor device 130 may detect a near field communication (NFC) enabled badge worn by the attendee, and may determine that the attendee has entered the classroom based on detecting the NFC enabled badge.

In another example, sensor device 130 may utilize RFID detection of an RFID enabled badge, an RFID module of client device 106-1, or the like to detect that the attendee has entered the classroom. In another example, client device 106-1 may scan an image, such as a quick response (QR) code or the like, and may transmit results of the scan to check the attendee in for the classroom. In another example, client device 106-1 may provide, for display, a user interface based on scanning a QR code to permit the attendee to check in for the classroom. In another example, sensor device 130 may scan an image (e.g., of a display of client device 106-1, of a badge, or the like) and may transmit results of the scan to check the attendee in for the classroom.

As further shown in FIG. 1C, and by reference number 132, cloud platform 104 may receive (e.g., from sensor device 130 or client device 106-1) an indication of the attendance check-in, and may store information indicating that the attendee of client device 106-1 is in the classroom. As shown by reference number 134, based on receiving the indication of the attendance check-in, cloud platform 104 may transmit, to the client device 136 (e.g., another client device used by an instructor in the classroom), information indicating that the attendee of client device 106-1 is present in the classroom. In this way, cloud platform 104 may obviate a need for an instructor to interrupt a session to update an attendance record, thereby saving class time for instruction. Moreover, based on cloud platform 104 saving class time for instruction, the session may be completed in a reduced amount of time, thereby reducing a power utilization of the connected learning center to operate lights, sensor devices, client devices, and/or display devices for the course. Furthermore, cloud platform 104 may improve an accuracy of attendance collection, thereby obviating a need to transmit messages to classroom attendees to confirm their attendance when manual attendance collection is unreadable or includes errors.

As further shown in FIG. 1C, and by reference number 138, cloud platform 104 may provide an updated class list to client devices 140 (e.g., another set of client devices used by attendees of in the classroom) and/or client device 106-1 to facilitate social networking between attendees in the classroom. As shown by reference number 139, cloud platform 104 may update another group of client devices not located in the classroom (not shown) to indicate that a session for a course taking place in the classroom is full, and may automatically schedule a new session time for the course based on popularity of the course. In another example, cloud platform 104 may provide information identifying the updated class list to another client device (e.g., utilized by staff of the connected learning center) to update credit information of a set of attendees of the course for attending the course, to update a quantity of meals that are to be prepared for attendees of the course, or the like. In another example, cloud platform 104 may provide information identifying the updated class list for display to remote attendees of the course.

Figure 1D:
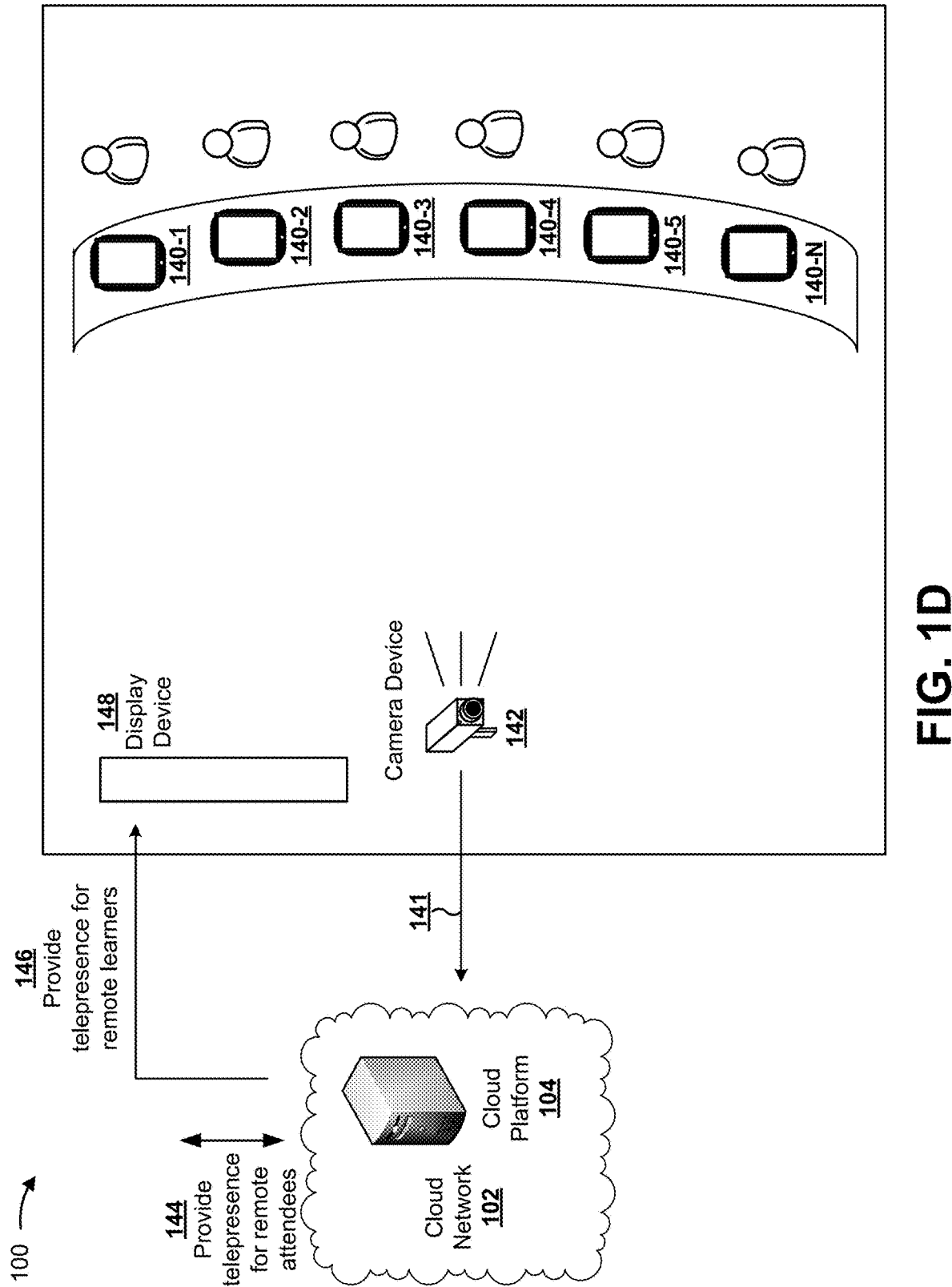

As shown in FIG. 1D, and by reference number 141, cloud platform 104 may receive a recording (e.g., streaming audio and/or video of a session of a course) from camera device 142 (e.g., a high-definition video camera sensor device). As shown by reference number 144, cloud platform 104 may provide the audio and/or video for playback via a user interface provided for display via a set of client devices located outside the classroom to permit remote learning by a set of remote attendees. As shown by reference number 146, cloud platform 104 may provide telepresence to display device 148 to permit classroom participation from the set of remote attendees. Based on providing telepresence, cloud platform 104 may permit classroom interaction between in-person attendees and remote attendees. For example, cloud platform 104 may receive a video of a solution to a classroom problem captured by a remote client device and completed by a remote attendee via the remote client device. In this case, cloud platform 104 may cause the video of the solution to be provided to the in-person attendees via a user interface of client devices 140, via a user interface provided by display device 148, or the like. In another example, cloud platform 104 may obtain audio and/or video from multiple camera devices, microphone devices, or the like in the classroom to provide multiple views of the course for playback to remote attendees via remote client devices.

In another example, cloud platform 104 may provide video of a first classroom for display via a display of a second classroom. For example, cloud platform 104 may receive video of an instructor of a class in a first classroom, and may provide the video for display via a display device of a second classroom to permit attendees to attend the class from the second classroom (e.g., in another room of the connected learning center or at a remote location). In another example, cloud platform 104 may store the video of the classroom, and may provide the video of the classroom at another time (e.g., for on-demand viewing).

Figure 1E:
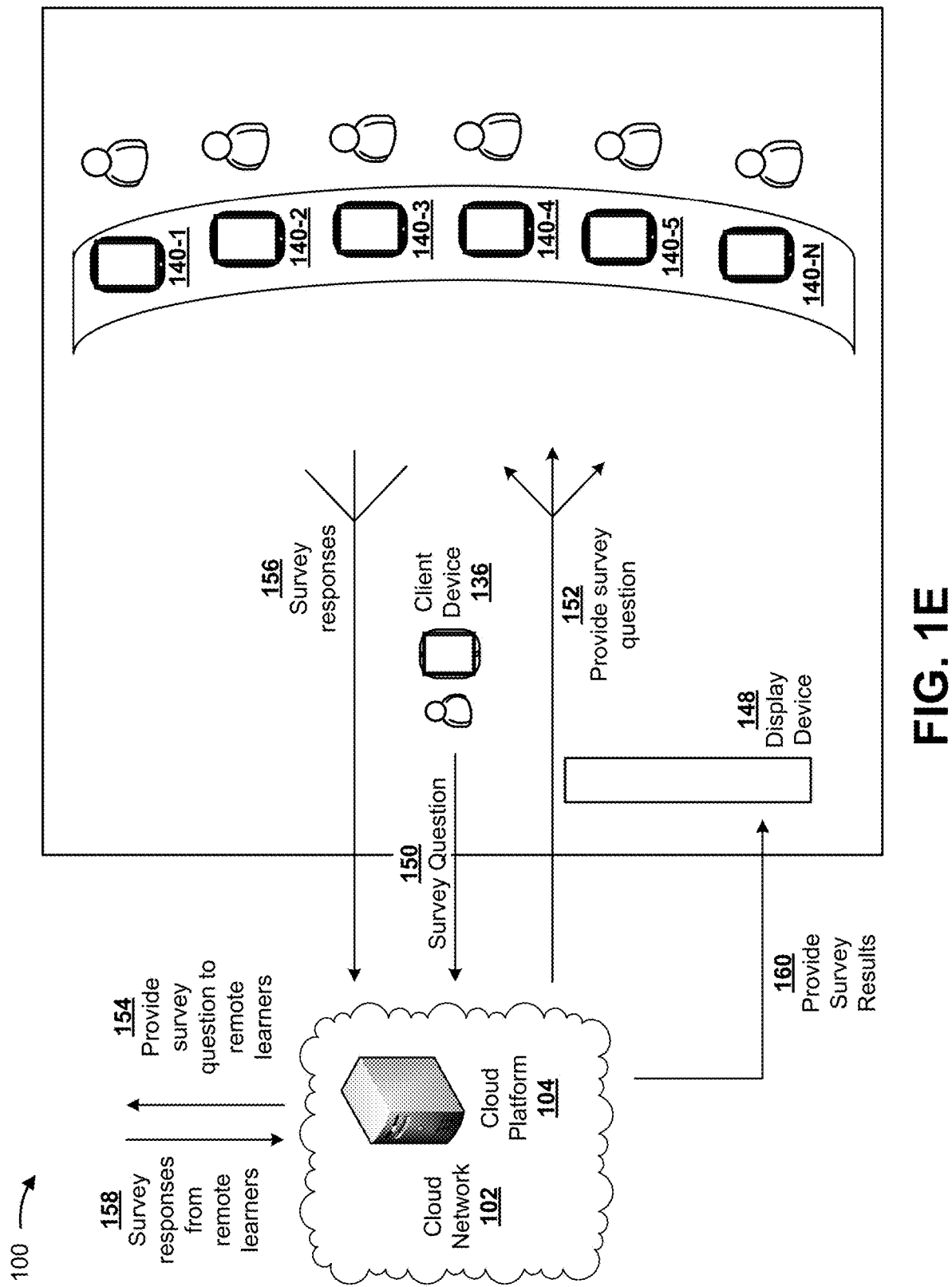

As shown in FIG. 1E, and by reference number 150, cloud platform 104 may receive information identifying a survey question from client device 136. For example, cloud platform 104 may receive, from client device 136, information requesting feedback regarding an instructor, information requesting a solution to a classroom problem, information requesting a vote on a topic for classroom discussion, or the like. Cloud platform 104 may provide the survey question via cloud network 102 to a set of client devices 140 or client device 106-1 for display via a user interface, as shown by reference number 152, and to a set of remote client devices (not shown) used by a set of remote attendees for display via a user interface, as shown by reference number 154. As shown by reference numbers 156 and 158, cloud platform 104 may receive information identifying a set of survey responses to the survey question from the set of client devices 140 and from the set of remote client devices. As shown by reference number 160, based on receiving information identifying the set of survey responses, cloud platform 104 may provide a result of the set of survey responses for display via display device 148. In this way, cloud platform 104 permits an instructor to distribute a survey to and obtain a set of survey responses from in-person attendees and remote attendees of a course in a reduced amount of time, thereby reducing a utilization of processing resources relative to when the instructor is required to manually provide the survey question and collect responses. In another example, cloud platform 104 may provide the result of the set of survey responses to another group of client devices for display to a set of administrators of the connected learning center, to permit the set of administrators to monitor the classroom, the instructor, the attendees, or the like.

As shown in FIG. 1F, and by reference number 162, cloud platform 104 may provide live or recorded access to a session of a course for display via a set of client devices (e.g., a set of remote client devices) to a set of remote attendees. As shown by reference number 164, the set of client devices may provide another view of the user interface for display based on cloud platform 104 providing access to the session of the course. For example, cloud platform 104 may include, in the user interface, course information, such as information identifying a course, an instructor, a course time, a course location, or the like. Similarly, cloud platform 104 may include, in the user interface, information identifying one or more survey questions for the course. As shown by reference number 166, cloud platform 104 may receive information related to the access to the session (e.g., a survey response, audio and/or video of a user of a particular client device, or a homework assignment transmitted from a remote client device).

Figure 1G:
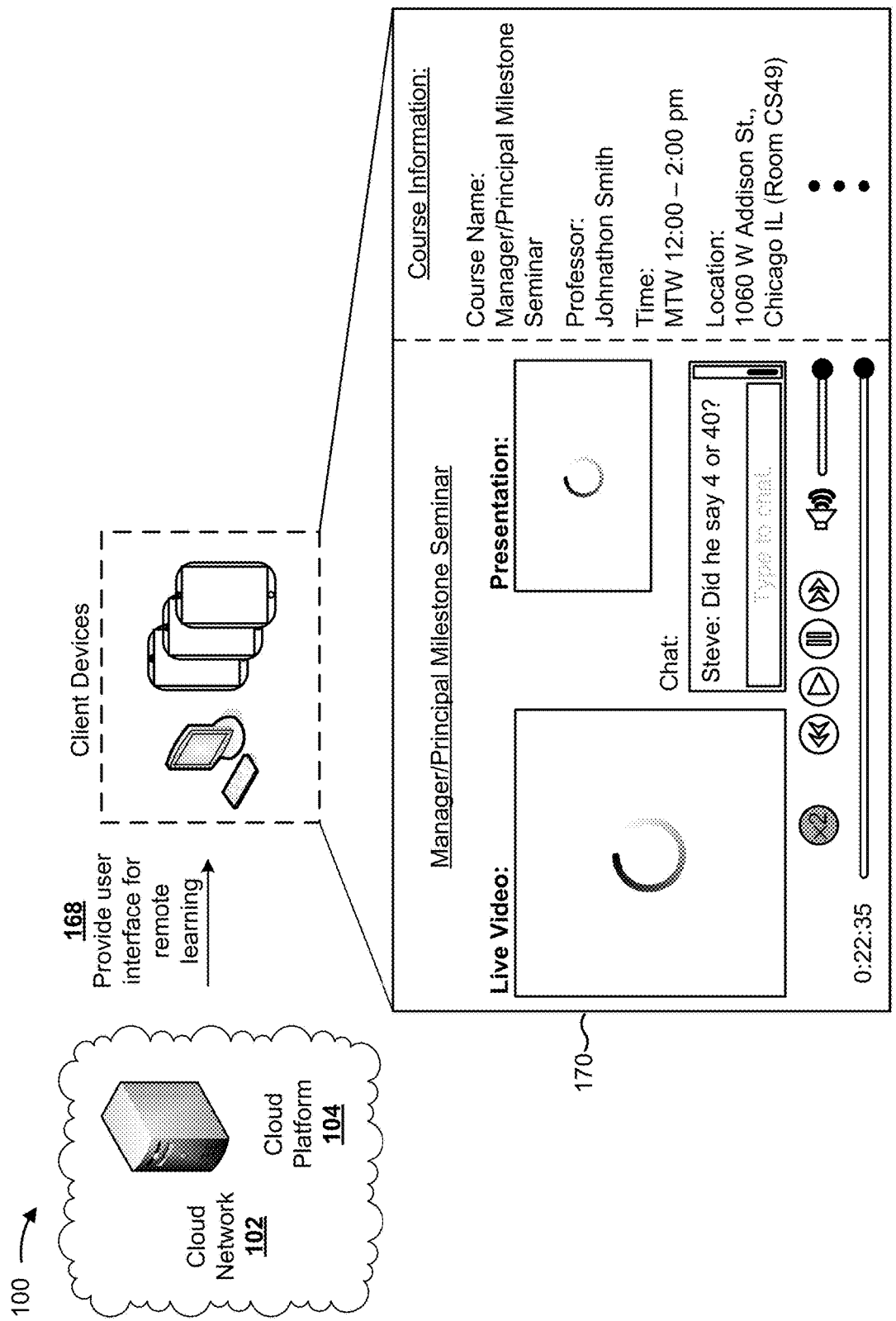

As shown in FIG. 1G, and by reference number 168, cloud platform 104 may provide another view of the user interface for display via the set of client devices (e.g., the set of remote client devices). As shown by reference number 170, cloud platform 104 may include a set of user interface elements associated with providing playback of a session of a course (e.g., live playback or time-shifted playback). For example, the user interface may include a video module (e.g., for providing live audio and/or video or time-shifted audio and/or video), a presentation module (e.g., for providing a set of slides associated with the session of the course), a set of playback adjustment buttons (e.g., for permitting playback adjustment, such as pausing playback, rewinding playback, altering a speed of playback, or the like), and a chat room functionality (e.g., for allowing users to communicate via respective client devices).

In some implementations, cloud platform 104 may provide multiple versions of the chat room functionality. For example, cloud platform 104 may provide in-class chat room functionality (e.g., for attendees present in the classroom) and a remote-user chat room functionality (e.g., for attendees not present in the classroom). In this way, cloud platform 104 prevents remote attendees, who may be attempting to understand a difficult concept or who may be attempting to hear an instructor, from distracting in-person attendees, thereby improving chat functionality. In another example, cloud platform 104 may provide a live chat room functionality (e.g., for in-person attendees and/or remote attendees attending the course) and a time-shifted chat room functionality (e.g., for recorded playback of the course). In this way, cloud platform 104 permits communication to client devices being utilized, rather than causing a time-shifted attendee to be provided messages from a set of attendees no longer attending the course or a set of solutions to an in-class question before a solution to the in-class question is revealed by an instructor. In another example, cloud platform 104 may provide an on-time chat room functionality (e.g., for attendees who arrived at a session on time) and late-arriver chat room functionality (e.g., for attendees who did not arrive at a session on time). In this way, cloud platform 104 avoids providing questions from late-arriving attendees that may lack relevancy to on-time attendees, such as questions relating to course material discussed prior to the late-arriving attendees arriving, and reduces a quantity of requests transmitted to a server to avoid providing the questions, thereby reducing a utilization of network resources relative to another technique where an instructor has to manually remove questions from the late-arriving attendees from the chat room functionality. In some implementations, cloud platform 104 may time-stamp chat messages transmitted via the chat room functionality, and may cause chat messages to be provided to time-shifted attendees based on the time-stamp, thereby permitting a chat message regarding an in-class problem to be provided at a time of the playback when the in-class problem is being discussed.

Figure 1H:
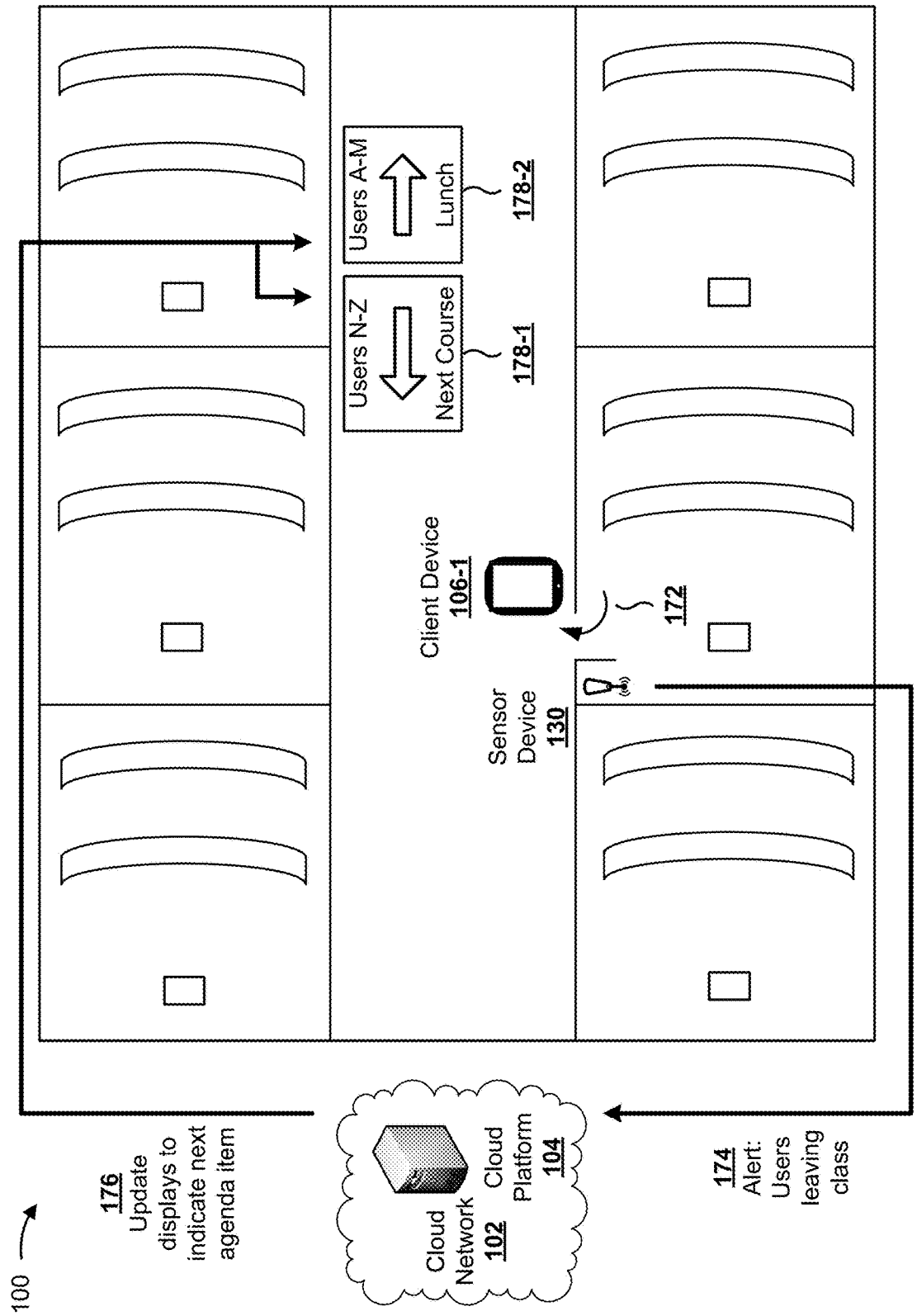

As shown in FIG. 1H, and by reference number 172, sensor device 130 may detect client device 106-1 leaving a classroom. As shown by reference number 174, cloud platform 104 may receive an alert that the user of client device 106-1 is leaving the classroom. As shown by reference number 176, cloud platform 104 may update a user interface of a set of display devices 178-1 and 178-2 to provide information for display to the user of client device 106-1. For example, cloud platform 104 may provide information targeted at the user of client device 106-1 and/or one or more other users determined to be exiting the classroom (e.g., directions to a subsequent course location or directions to a lunch location). In another example, cloud platform 104 may cause information identifying the subsequent course location or the directions to the lunch location to be provided for display via a user interface of client device 106-1 and/or another client device.

Figure 1I:
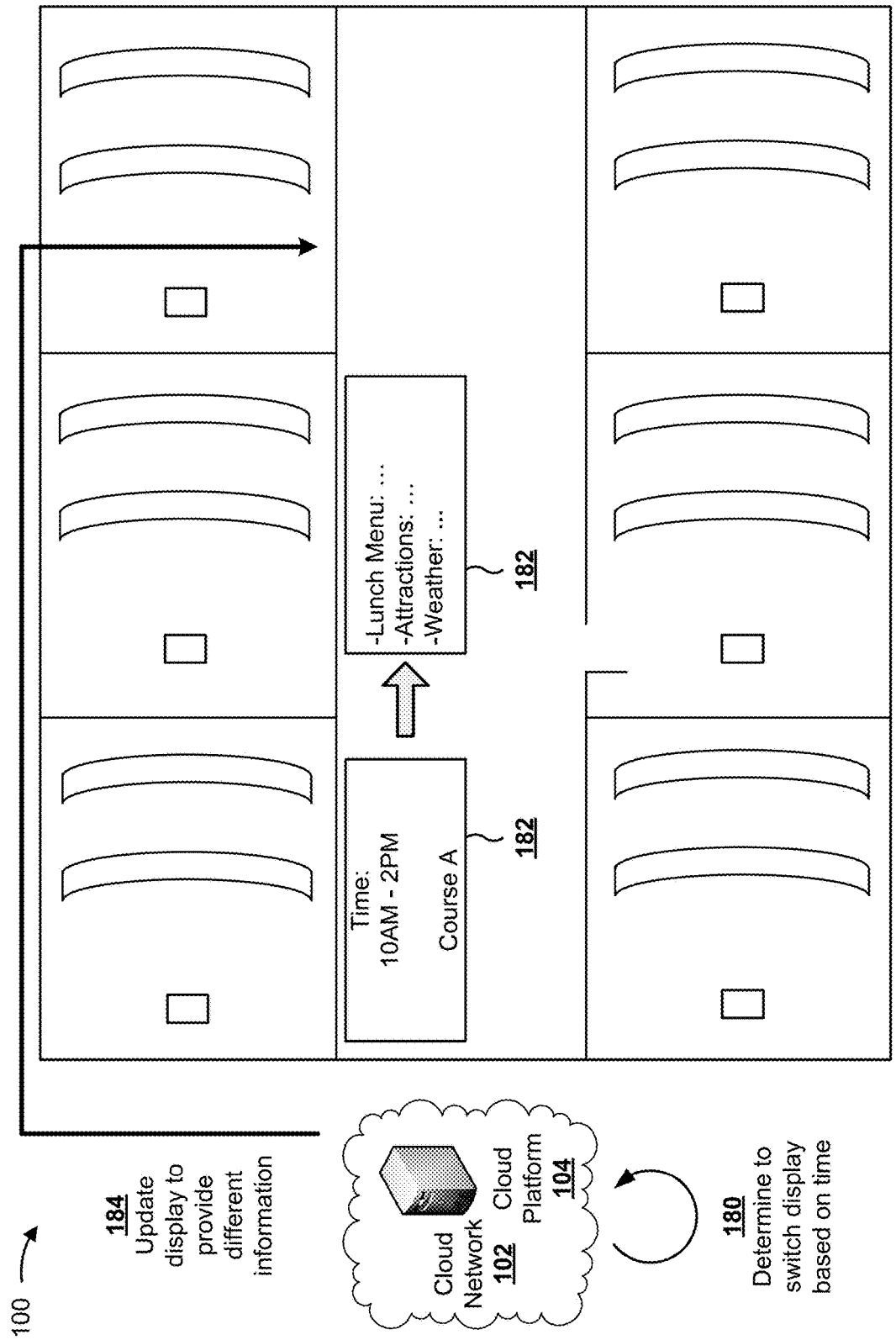

As shown in FIG. 1I, and by reference number 180, cloud platform 104 may determine to switch the information provided via display device 182 based on another trigger, such as based on a time or the like. For example, as shown by reference number 184, at a particular time when a course is ended, cloud platform 104 may dynamically update a user interface of display device 182 from providing information identifying the course to information identifying a lunch menu, a set of attractions, a weather forecast, or the like. In this way, cloud platform 104 dynamically alters information provided via display device 182 to provide information desired by a set of attendees of the connected learning center.

In another example, cloud platform 104 may update display device 182 based on a change in a set of attendees of the connected learning center. For example, cloud platform 104 may cause display device 182 to provide first information associated with a first organization using the connected learning center at a first time and may cause display device 182 to provide second information associated with a second organization at a second time based on determining that a first set of attendees associated with the first organization have exited the connected learning center and that a second set of attendees associated with the second organization have entered the connected learning center.

In this way, cloud platform 104 combines stored information relating to a connected learning center (e.g., training center information, course information, user information, or other information) and/or sensor data (e.g., identifying locations of users in the connected learning center) to provide one or more views of an user interface via a set of client devices, a set of display devices, or the like, thereby improving information management associated with the connected learning center. Moreover, cloud platform 104 automatically performs tasks, such as attendance collection, course registration, course scheduling, classroom testing, or the like, thereby saving class time for instruction and reducing costs relative to requiring the tasks to be performed manually by staff members. Furthermore, cloud platform 104 provides communication between multiple groups of users, such as via client devices utilized by a group of in-person attendees, a group of remote attendees, a group of instructors, or the like, thereby improving a learning experience relative to each group being isolated.

As indicated above, FIGS. 1A-1I are provided merely as an example. Other examples are possible and may differ from what was described with regard to FIGS. 1A-1I.

Figure 2:
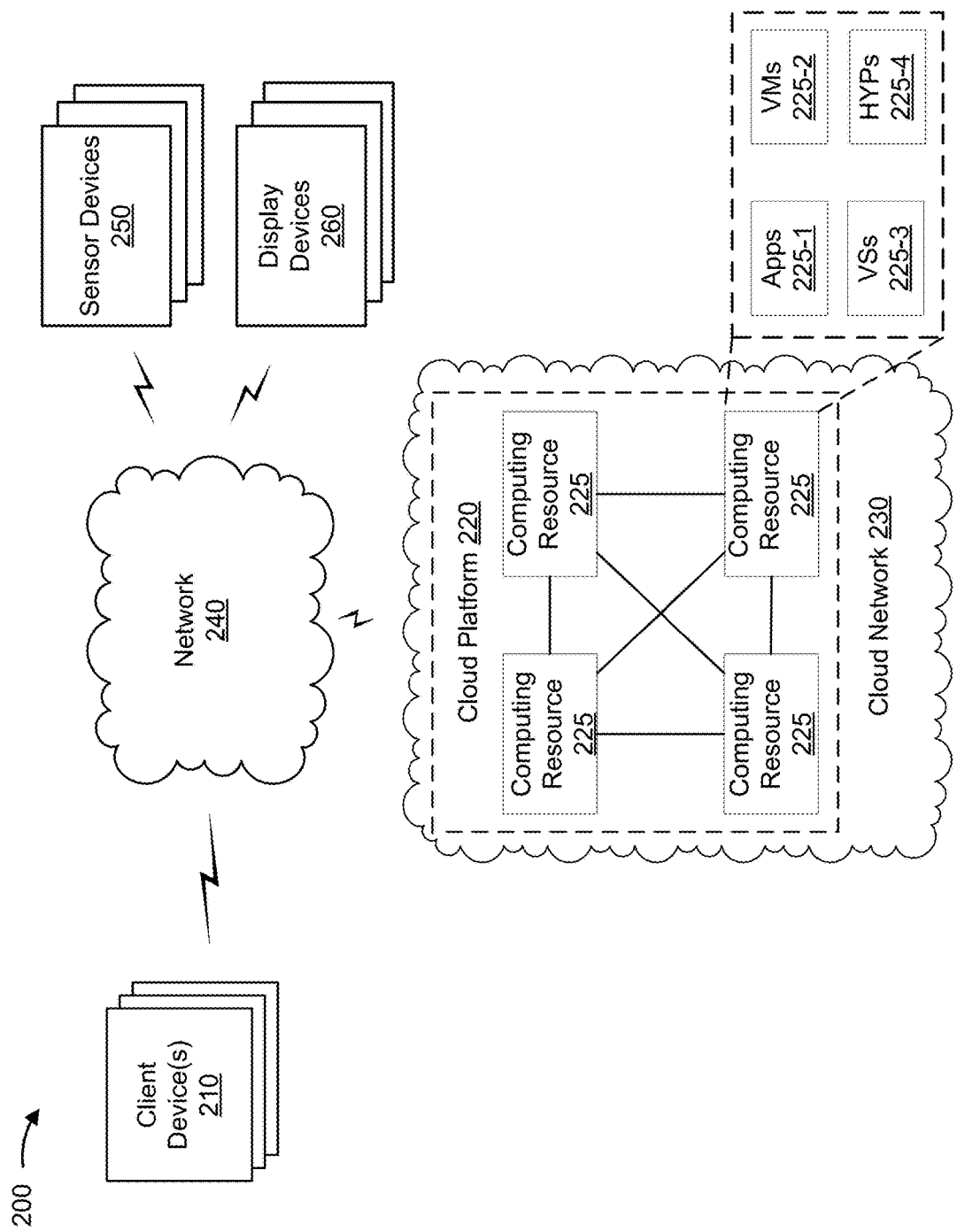
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210, a cloud platform 220, a cloud network 230, a network 240, one or more sensor devices 250, and one or more display devices 260. Devices of environment 200 may interconnect via wired connections, wireless connections, or a combination of wired and wireless connections.

Client device 210 includes one or more devices capable of receiving, generating, storing, processing, and/or providing information associated with a connected learning center. For example, client device 210 may include a communication and/or computing device, such as a mobile phone (e.g., a smart phone or a radiotelephone), a computer (e.g., a laptop computer, a tablet computer, a handheld computer, or a desktop computer), a wearable communication device (e.g., a smart wristwatch or a pair of smart eyeglasses), a wearable beacon device (e.g., a Bluetooth enabled beacon, an NFC enabled badge, or an RMID enabled badge), or a similar type of device. In some implementations, client device 210 corresponds to client devices 106-1, 106-2, 136, 140, or the like shown in FIGS. 1A-1I. In some implementations, client device 210 may receive information from and/or transmit information to another device in environment 200 (e.g., via network 240).

Cloud platform 220 includes one or more devices capable of storing, processing, and/or routing information associated with a connected learning center. For example, cloud platform 220 may include a server that is associated with assigning resources of cloud network 230, directing functionalities of cloud network 230, or the like. In some implementations, cloud platform 220 may include a communication interface that allows cloud platform 220 to receive information from and/or transmit information to other devices in environment 200. While cloud platform 220 is described as a resource in a cloud computing network, such as cloud network 230, cloud platform 220 may operate external to a cloud computing network, in some implementations. In some implementations, cloud platform 220 corresponds to cloud platform 104 shown in FIGS. 1A-1I.

In some implementations, cloud platform 220 may be hosted by a cloud computing environment, such as cloud network 230 or the like. The cloud computing environment may provide computation, software, data access, storage, etc. services that do not require end-user knowledge of a physical location and configuration of system(s) and/or device(s) that host cloud platform 220. As shown, the cloud computing environment may include a group of computing resources 225 (referred to collectively as "computing resources 225" and individually as "computing resource 225").

Computing resource 225 includes one or more personal computers, workstation computers, server devices, or another type of computation and/or communication device. In some implementations, computing resource 225 may host cloud platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 includes a group of cloud resources, such as one or more applications ("APPs") 225-1, one or more virtual machines ("VMs") 225-2, one or more virtualized storages ("VSs") 225-3, or one or more hypervisors ("HYPs") 225-4.

Application 225-1 includes one or more software applications that may be provided to or accessed by one or more devices of environment 200. For example, applications 225 may include a user interface application associated with providing information regarding a connected learning center, remote access to a course being provided in a connected learning center, or the like. Application 225-1 may eliminate a need to install and execute the software applications on devices of environment 200. For example, application 225-1 may include software associated with cloud platform 220 and/or any other software capable of being provided via a cloud computing environment. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., associated with one or more devices of environment 200), and may manage infrastructure of a cloud computing environment, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 may provide hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Cloud network 230 includes an environment that delivers computing as a service, whereby shared resources, services, etc. may be provided by cloud platform 220 to store, process, and/or route information associated with a connected learning center. Cloud network 230 may provide computation, software, data access, storage, and/or other services that do not require end-user knowledge of a physical location and configuration of a system and/or a device that delivers the services (e.g., cloud platform 220). As shown, cloud network 230 may include cloud platform 220 and/or may communicate with client device 210 via one or more wired or wireless networks (e.g., network 240). In some implementations, cloud network 230 corresponds to cloud network 102 shown in FIGS. 1A-1I.

Network 240 includes one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a personal area network (PAN), a telephone network (e.g., the Public Switched Telephone Network (PSTN)), a private network, an ad hoc network, an intranet, the Internet, a fiber optic-based network, a cloud computing network, a peer-to-peer network, or the like, and/or a combination of these or other types of networks.

Sensor device 250 includes one or more devices capable of receiving, generating, storing, processing, and/or providing information associated with a sensor measurement. For example, sensor device 250 may include a camera, a microphone, a beacon (e.g., a Bluetooth beacon), a biometric sensor, an environmental sensor, a proximity sensor, a motion detector, a seat occupancy sensor, or the like. In some implementations, sensor device 250 corresponds to sensor device 130, camera device 141, or the like shown in FIGS. 1A-1I. In some implementations, sensor device 250 may communicate with one or more devices of environment 200 via a network (e.g., network 240).

Display device 260 includes any digital or analog display that is capable of presenting audio and/or video content provided by cloud platform 220. Display device 260 may include technologies, such as cathode ray tube (CRT) displays, liquid crystal displays (LCDs), light-emitting diode (LED) displays, plasma displays, or the like. Examples of display device 260 may include a television, a projector, a computer monitor, a smart whiteboard, a touch-capable display, and/or another type of device capable of presenting audio and/or video content. In some implementations, display device 260 may be a wall-mounted display device, a free-standing display device, or the like. In some implementations, display device 260 corresponds to a display of client device 210. In some implementations, display device 260 corresponds to display devices 148, 178, or the like shown in FIGS. 1A-1I. In some implementations, display device 260 corresponds to device 106 (e.g., display device 106-3) shown in FIG. 1A.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
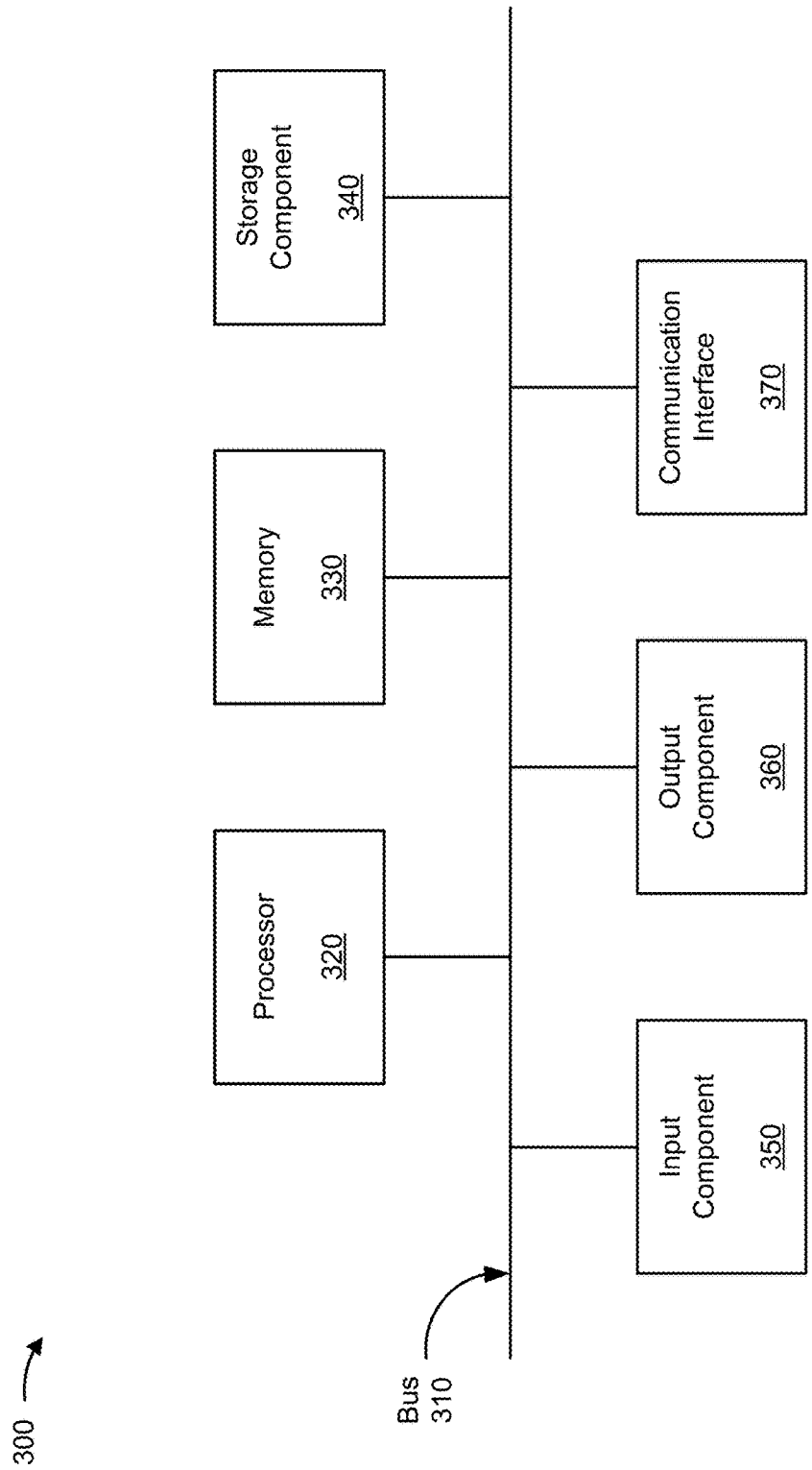
FIG. 3 is a diagram of example components of one or more devices of FIG. 2.

FIG. 3 is a diagram of example components of a device 300. Device 300 may correspond to client device 210, cloud platform 220, sensor device 250, and/or display device 260. In some implementations, client device 210, cloud platform 220, sensor device 250, and/or display device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
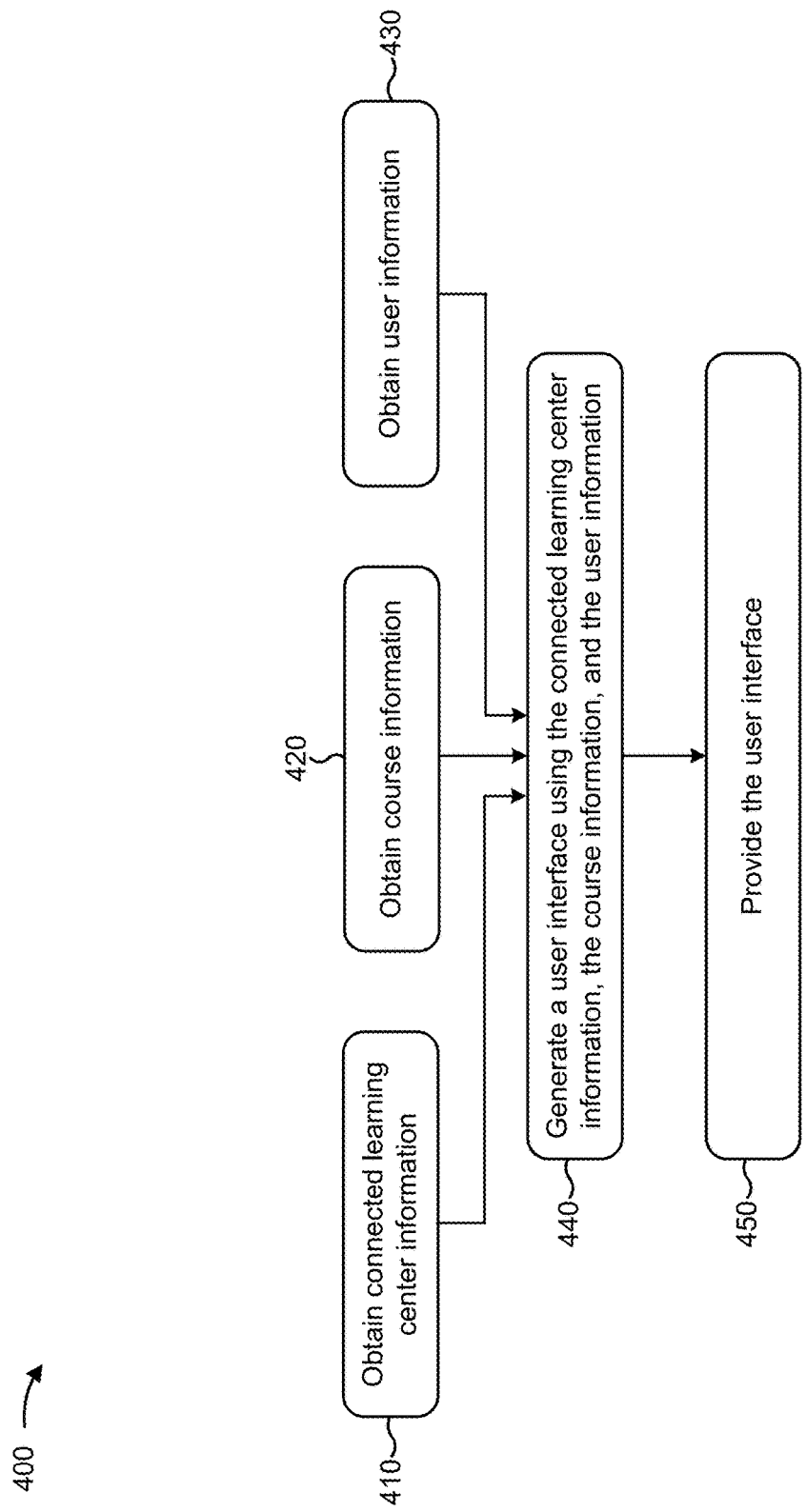
FIG. 4 is a flow chart of an example process for performing information management for a connected learning center.

FIG. 4 is a flow chart of an example process 400 for performing information management for a connected learning center. In some implementations, one or more process blocks of FIG. 4 may be performed by cloud platform 220. In some implementations, one or more process blocks of FIG. 4 may be performed by another device or a group of devices separate from or including cloud platform 220, such as client device 210, sensor device 250, and display device 260.

As shown in FIG. 4, process 400 may include obtaining connected learning center information (block 410). For example, cloud platform 220 may obtain information regarding a connected learning center. The connected learning center may refer to a location that hosts classes and/or training courses. For example, cloud platform 220 may obtain information regarding a college campus, a school, a conference center, a convention center, a hotel with conference rooms, an office with conference rooms or classrooms, a corporate retreat, or the like.

In some implementations, cloud platform 220 may obtain building information associated with the connected learning center. For example, cloud platform 220 may obtain information identifying a layout of the connected learning center, a location of a room in the connected learning center, a location of a point of interest in the connected learning center (e.g., a bathroom, a cafeteria, a water fountain, or an exit). Additionally, or alternatively, cloud platform 220 may obtain information regarding a set of sensor devices 250 (e.g., a location of sensor device 250, a type of sensor device 250, or a type of information collected from sensor device 250), a set of display devices 260 (e.g., a location of display device 260 or information that is being displayed on display device 260), or the like.

In some implementations, cloud platform 220 may obtain sensor information associated with the connected learning center. For example, cloud platform 220 may receive sensor information identifying a set of locations of a set of client devices 210 inside the connected learning center, motion of a set of users inside the connected learning center, or the like. Additionally, or alternatively, cloud platform 220 may receive sensor information from camera sensor device 250 indicating that a chair is occupied in a classroom or from a sensor that senses (e.g., based on weight) when a chair is occupied. Additionally, or alternatively, cloud platform 220 may receive information associated with the connected learning center based on client device 210 being within a threshold proximity of the connected learning center, such as weather information, flight information, restaurant information, hotel information, information identifying attractions near the connected learning center, or the like. Additionally, or alternatively, cloud platform 220 may receive information identifying an office of an instructor (e.g., via a data structure, via an integration with a mapping application, or the like). Additionally, or alternatively, cloud platform 220 may receive transportation information (e.g., a bus schedule, a car service availability, or the like).

In some implementations, cloud platform 220 may obtain information regarding a connected learning center from a data structure, such as an internal data structure storing information regarding the connected learning center, an external data structure storing information associated with the connected learning center (e.g., a flight schedule storage device of flights at an airport within a threshold proximity of the connected learning center, a restaurant location storage device of restaurants within a threshold proximity of the connected learning center, or a weather forecasting storage device), or the like. In some implementations, cloud platform 220 may obtain sensor information from sensor device 250. For example, cloud platform 220 may obtain information identifying a location of a user in the connected learning center via a Bluetooth beacon of sensor device 250, motion of the user from motion sensor device 250, an occupied chair in a classroom of the connected learning center from camera sensor device 250, or the like.

As further shown in FIG. 4, process 400 may include obtaining course information (block 420). For example, cloud platform 220 may obtain information regarding a course offered at the connected learning center. The course may refer to a training course, such as a continuing legal education (CLE) course, a management training course, an exam preparation course, a seminar, a demonstration, a laboratory course, or the like. In some implementations, cloud platform 220 may obtain information identifying a set of courses being offered at the connected learning center. For example, cloud platform 220 may obtain information indicating that a particular set of courses are available for registration. Additionally, or alternatively, cloud platform 220 may obtain information associated with a course, such as a required reading list, a syllabus, an instructor's name, a list of prerequisite courses, or the like. Additionally, or alternatively, cloud platform 220 may obtain information associated with a session of a course (e.g., a set of sessions offered for the course, a time of a particular session, a location of a particular session, or a list of attendees of a particular session).

In some implementations, cloud platform 220 may obtain information regarding a course offered at the connected learning center from a data structure storing information regarding a set of courses offered at the connected learning center. For example, cloud platform 220 may obtain information indicating that a particular session of a course is offered at a particular time and at a particular location in the connected learning center from a course storage device. In some implementations, cloud platform 220 may obtain information regarding a course offered at a connected learning center by using a machine learning technique to parse a document associated with the course. For example, cloud platform 220 may perform a natural language processing technique on a course syllabus document to identify a course subject, a set of session times for a course, a course instructor, or the like. In some implementations, cloud platform 220 may determine information regarding the course offered at the connected learning center based on obtaining sensor data. For example, cloud platform 220 may identify a quantity of in-person attendees present in a session based on the number of client devices 210 in the classroom. Additionally, or alternatively, cloud platform 220 may identify a quantity of remote attendees in a session based on the number of client devices 210 streaming audio and/or video of the session via network 240.

As further shown in FIG. 4, process 400 may include obtaining user information (block 430). For example, cloud platform 220 may obtain user information associated with a user of client device 210 (e.g., an in-person attendee at the connected learning center, a remote attendee accessing a course via client device 210, or an instructor of a course). In some implementations, cloud platform 220 may obtain user information relating to an attendee. For example, cloud platform 220 may obtain information identifying a name of the attendee, a user name associated with a login to client device 210, a password, or the like. In this case, cloud platform 220 may utilize the user name, the password, or the like to perform a verification procedure to determine an identity of the user and permit access to the course, provide credit for the course, or the like. Additionally, or alternatively, cloud platform 220 may obtain information identifying a set of user preferences for the attendee, an attendance history, a set of course ratings for a set of courses completed by the attendee, or a schedule for the attendee. In some implementations, cloud platform 220 may obtain user information relating to a remote attendee, such as an address of the remote attendee, a time zone of the remote attendee, or the like. In some implementations, cloud platform 220 may obtain user information relating to an instructor, such as credentials of the instructor, a quantity of years of experience, or the like. In some implementations, cloud platform 220 may obtain user information identifying a travel schedule of a user (e.g., a flight schedule), a reservation of the user (e.g., a hotel reservation, a flight reservation, or a restaurant reservation), or the like.

In some implementations, cloud platform 220 may obtain information regarding a user of client device 210 from a data structure storing information regarding a set of users. For example, cloud platform 220 may obtain a user name and password associated with a login to client device 210 from a user profile storage device. In some implementations, cloud platform 220 may obtain, from client device 210, user information regarding a user of client device 210. For example, cloud platform 220 may obtain user information stored in client device 210, such as a set of user preferences, an address for the user, a name of the user, or the like. In some implementations, cloud platform 220 may provide a user interface, for display via client device 210, to obtain user information. For example, cloud platform 220 may cause a set of prompts to be provided via the user interface, and may detect a set of user interactions associated with providing a set of responses to the set of prompts. In this case, cloud platform 220 may determine user information based on the set of responses to the set of prompts.

In some implementations, cloud platform 220 may obtain information regarding attendance of an attendee. For example, cloud platform 220 may receive, from sensor device 250, an indication that a particular client device 210 used by a particular user is located in a particular classroom. Based on sensor device 250 detecting client device 210, cloud platform 220 may determine that the user was an in-person attendee of a course associated with the classroom.

As further shown in FIG. 4, process 400 may include generating a user interface using connected learning center information, course information, and user information (block 440). For example, cloud platform 220 may combine the connected learning center information, the course information, and the user information into a user interface, and may generate the user interface based on the combination of collected information. In some implementations, cloud platform 220 may include other information in the user interface, such as weather information, flight information, restaurant information, hotel information, or the like.

In some implementations, cloud platform 220 may generate the user interface based on one or more techniques (e.g., machine learning, computational statistics, artificial intelligence, natural language processing, or the like). For example, cloud platform 220 may implement a technique that generates the user interface. In some implementations, cloud platform 220 may utilize the one or more techniques to receive, as input, information identifying a user and known circumstances of the user (e.g., a type of user, a gender of the user, a location of the user, a demographic of the user, a current weather condition, a current time of day, a schedule of the user, a client device used by the user, known interests of the user, sensor information relating to the user, a course being taken by the user, a quantity of people signed up for a course of the user, a quantity of people attending a course attended by the user, a quantity of people remotely attending a course attended by the user, a major of the user, or the like), and may correlate a user interface, as output, with the user in the known circumstances (e.g., using machine learning, computational statistics, artificial intelligence, natural learning processing, or the like). For example, cloud platform 220 may train a model using machine learning (or another model-training technique) and a training set that includes information about users, circumstances of the users, and user interfaces generated based on the users and the circumstances. Cloud platform 220 may then use the model to identify characteristics (e.g., a look and/or a feel) of a user interface for a particular user based on what cloud platform 220 knows of the user and circumstances of the user. In some implementations, cloud platform 220 may rank information based on a relevancy to the user (e.g., based on the known circumstances of the user), may determine that a subset of information satisfies a threshold rank, and may dynamically scale a size of text in a user interface, a size of the user interface, an arrangement of text and/or images in the user interface, or the like to ensure that the subset of information satisfying the threshold rank is included in a single user interface.

Additionally, or alternatively, cloud platform 220 may utilize the one or more techniques to receive information that identifies particular modules to be provided in association with the technique (e.g., to train a model, or the like). For example, cloud platform 220 may utilize machine learning to train a model to include information indicating that a set of in-person attendees of a course are to be provided with an in-class chat room functionality, an in-class virtual whiteboard, and in-class classroom participation materials via a set of user interfaces of the set of in-person attendees. Similarly, cloud platform 220 may utilize machine learning to train the model to include information indicating that a set of remote attendees of the course is to be provided with a playback module of an audio and/or video stream of the course, a remote-user chat room functionality, a remote-user virtual whiteboard, and remote-user classroom participation materials via a set of user interfaces of the set of remote attendees. In this way, cloud platform 220 may utilize one or more techniques to automatically generate a customized user interface based on information identifying a user and the circumstances of the user, thereby increasing the speed and accuracy of a generation of the customized user interface.

In some implementations, cloud platform 220 may include multiple modules in the user interface. For example, cloud platform 220 may generate a user interface including a wayfinding module to provide directions, a course information module, a course materials module, or the like. Additionally, or alternatively, cloud platform 220 may process information regarding a set of user preferences, a user schedule, a course availability, or the like to provide a course recommendation module with a set of course recommendations for a user. Additionally, or alternatively, cloud platform 220 may include a telepresence module in the user interface. In this case, based on receiving streaming audio and/or video from a set of sensor devices 250 in a classroom (e.g., a camera sensor device 250 and a microphone sensor device 250), cloud platform 220 may provide, via the telepresence module, the streaming audio and/or video. In some implementations, cloud platform 220 may provide audio and/or video of a course for delayed playback. For example, cloud platform 220 may provide the audio and/or video for storage and distribution via a content delivery network (CDN) to a set of client devices 210.

In some implementations, cloud platform 220 may include a classroom participation module in the user interface. For example, cloud platform 220 may include the classroom participation module that includes classroom participation materials of a course, such as a survey, a question set, a test, a course review, or the like. In this way, cloud platform 220 reduces a utilization of classroom time, a quantity of staff and office materials, and a cost associated therewith relative to a learning center being required to hire extra staff to pass out class participation materials.

In some implementations, cloud platform 220 may include a module with one or more advertisements in the user interface. For example, cloud platform 220 may select an advertisement for a user based on user information, a user's location, a user's course information, or the like, and may include the selected advertisement in the user interface. Moreover, cloud platform 220 may provide one or more advertisements regarding one or more activities at the connected learning center, such as for a course that is being offered (e.g., graduate record examination (GRE) preparation course), an experiment that is soliciting volunteers, a demonstration that is occurring, a dining activity (e.g., a group meal, a lunch service, etc.), a networking activity (e.g., a meeting, a happy hour, a business card exchange event), a classroom activity (e.g., a class), or the like targeted based on user information.

In some implementations, cloud platform 220 may include an alert module in the user interface. For example, cloud platform 220 may identify a set of alerts that are to be provided for display to a user (e.g., an alert regarding an upcoming course, an alert regarding an assignment, an alert regarding a network event, or an alert regarding a flight delay), and may include the set of alerts in an alert module of the user interface.

In some implementations, cloud platform 220 may include a social network integration module in a user interface. For example, cloud platform 220 may include a social network profile (e.g., LinkedIn, Facebook, Twitter, or a private social network for the connected learning center) in the social network integration module of the user interface. Additionally, or alternatively, cloud platform 220 may include information from client device 210 (e.g., user proximity or an address of a remote user) in the social network integration module to provide social network information regarding a user of client device 210. In this way, cloud platform 220 may facilitate and enhance networking for a set of users of a set of client devices 210, thereby reducing cost for social events relative to when the connected learning center needs to hold social events for networking between the attendees of the connected learning center.

In some implementations, cloud platform 220 may include a communication module in the user interface. For example, cloud platform 220 may include chat room functionality (e.g., a discussion board, a forum, or a group chat) for a course in the communication module of the user interface to permit an attendee to communicate with the instructor and other attendees of a course. Additionally, or alternatively, cloud platform 220 may include a virtual white board (e.g., a virtual space where users may draw figures, equations, or the like) in the communication module of the user interface to permit an attendee to provide a solution to a problem via input to a first client device 210, and cloud platform 220 may cause the solution to the problem to be provided for display via a second client device 210, a particular display device 260, or the like. In this way, cloud platform 220 may provide to a set of users a chat room functionality via the user interface to permit communication and collaboration between the set of users.

In some implementations, cloud platform 220 may periodically update the user interface. For example, cloud platform 220 may receive updated information regarding the connected learning center (e.g., updated connected learning center information, updated course information, or updated user information), and may update a user interface to provide the updated information via client device 210. In some implementations, cloud platform 220 may update the user interface based on receiving a document. For example, cloud platform 220 may receive, from a first client device 210 utilized by an attendee, an exam completed by an attendee, and may provide results of the exam for display via a second client device 210 utilized by an instructor. In this case, cloud platform 220 may receive, from second client device 210, instructor feedback relating to the results of the exam, and may provide the feedback for display via a particular user interface of first client device 210. In some implementations, cloud platform 220 may provide, to client device 210, an update notification. For example, cloud platform 220 may alter the user interface to provide a notification that an upcoming session has switched to a different classroom.

In some implementations, cloud platform 220 may generate multiple versions of the user interface for display via multiple client devices 210. For example, cloud platform 220 may generate, for display to an attendee using a first client device 210, a first user interface that includes course information (e.g., a syllabus or class materials), a class poll, or content selected by an instructor (e.g., a video clip). In this case, cloud platform 220 may generate, for display to an instructor using a second client device 210, a second user interface that includes attendance information (e.g., a quantity of in-person attendees attending class, a quantity of attendees missing class, or a quantity of remote attendees attending class), participation information, or testing information (e.g., a number of students that scored above a particular threshold score on an exam). Similarly, cloud platform 220 may generate, for display to an administrator using a third client device 210, a third user interface that includes course popularity information. Additionally, or alternatively, cloud platform 220 may include trend information in the third user interface. For example, cloud platform 220 may perform a machine learning technique to analyze the trends in course attendance, course popularity, exam scoring, or the like, and may provide a recommendation relating to improving course attendance, course popularity, or exam scoring based on recommendation information relating to one or more other courses.

In some implementations, cloud platform 220 may update the user interface based on monitoring devices (e.g., client device 210, sensor device 250, or display device 260). For example, cloud platform 220 may monitor sensor device 250 to determine a quantity of attendees of a session, and may provide updated attendance information via the user interface. Similarly, cloud platform 220 may monitor client device 210 to determine information regarding a user in the class (e.g., location of the user). Based on monitoring client device 210, cloud platform 220 may update the user interface to include wayfinding directions and perform crowd control within a connected learning center. For example, cloud platform 220 may cause a first group of people to be directed via a first route and a second group of people to be directed via a second route. In this way, cloud platform 220 may reduce a likelihood of crowd congestion in the connected learning center. Additionally, or alternatively, based on monitoring client device 210, cloud platform 220 may alter the user interface to provide notifications to the user. For example, cloud platform 220 may monitor the location of the user, and may alter the user interface to provide a notification indicating an upcoming class and the estimated time of arrival of the user for the upcoming class.

In some implementations, cloud platform 220 may provide information based on combining the information relating to the connected learning center. For example, cloud platform 220 may automatically submit information identifying attendance to a server associated with an accreditation body, such as CLE information, continuing medical education (CME) information, certification information, or the like. Based on submitting information, cloud platform 220 may include, in the user interface, a notification that the information identifying the attendance is submitted to the accreditation body and/or an approval of credit by the accreditation body. Additionally, or alternatively, based on submitting information, cloud platform 220 may include, in a user interface to be provided to an instructor via client device 210, a notification indicating that an attendee is taking a course for credit.

As further shown in FIG. 4, process 400 may include providing the user interface (block 450). For example, cloud platform 220 may provide the user interface via client device 210. In some implementations, cloud platform 220 may cause client device 210 to provide the user interface for display. For example, cloud platform 220 may detect client device 210 in a classroom and may provide, to client device 210, information regarding a session of a course that is being provided in the classroom for display. Additionally, or alternatively, cloud platform 220 may provide the user interface for display via a remote client device 210 to a remote attendee. In some implementations, cloud platform 220 may provide communication between a set of users in the user interface. For example, cloud platform 220 may receive a question from a remote attendee based on detecting a user interaction via a first user interface on a first client device 210, and may cause the question to be provided for display to an instructor via a second user interface of a second client device 210. In this way, remote attendees may communicate with an instructor during a session relative to when the remote attendees do not have communication with the instructor during the session.

In some implementations, cloud platform 220 may provide the user interface via display device 260. For example, cloud platform 220 may provide information, for display, that is customized for a set of attendees on display device 260, such as an agenda, an advertisement, or a set of wayfinding directions, based on determining that the set of attendees are within a threshold proximity of display device 260. In some implementations, cloud platform 220 may provide information for display on display device 260 in a classroom. For example, cloud platform 220 may provide the user interface via a display device 260 in a classroom to provide telepresence in the classroom for a set of remote attendees, to provide a set of survey responses, to provide a set of course materials, or the like. In some implementations, cloud platform 220 may provide images of a conference event in the user interface of display device 260 based on client device 210 being used to take photographs of the conference event.

In some implementations, cloud platform 220 may provide the user interface via client device 210 or display device 260 to provide a set of alerts. For example, cloud platform 220 may provide an alert that a course is available by altering the user interface to include a notification of an alert and a link that launches a recording (e.g., streaming audio and/or video) of the course via the user interface. In some implementations, cloud platform 220 may synchronize a set of user interfaces. For example, cloud platform 220 may detect a session of a course being held via telepresence in multiple classrooms. Based on the session being held in the multiple classrooms, cloud platform 220 may synchronize audio and/or video streaming from the multiple classrooms, and may provide the synchronized streaming audio and/or video into a module of a set of user interfaces provided via a set of client devices 210 or display devices 260 to permit a set of users of the session in different classrooms to participate in discussion in real-time.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
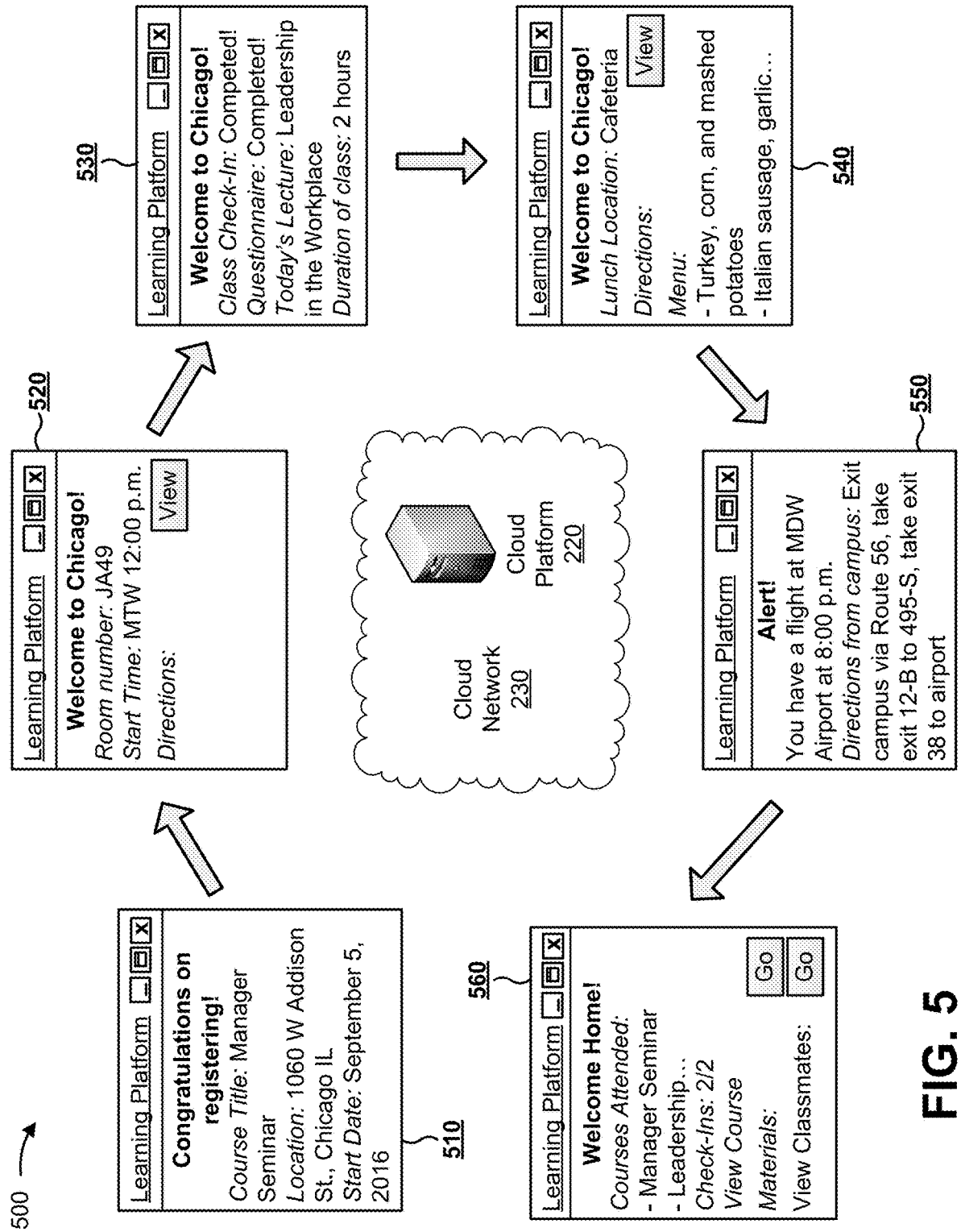
FIG. 5 is a diagram of an example implementation relating to the example process shown in FIG. 4.

FIG. 5 is an example implementation 500 relating to example process 400 shown in FIG. 4. FIG. 5 shows an example of performing information management for a connected learning center.

As shown in FIG. 5, cloud platform 220 provides an end-to-end set of user interfaces for display (e.g., via client device 210). As shown by reference number 510, at a first time, cloud platform 220 provides user interface 510 based on a user completing registration for a course at a connected learning center. In this case, cloud platform 220 provides information identifying the course, a location of the course, and a date of the course. As shown by reference number 520, at a second time, cloud platform 220 provides user interface 520 based on a user being located at the connected learning center (e.g., based on cloud platform 220 receiving location information indicating that client device 210 is within a threshold proximity of the connected learning center). In this case, cloud platform 220 provides information identifying a room at which the course is to occur, a start time of the course, and a user interface element to view a set of directions to the room at which the course is to occur.

As further shown in FIG. 5, and by reference number 530, at a third time, cloud platform 220 provides user interface 530 based on determining that the user is at the connected learning center and at the room at which the course is occurring. In this case, cloud platform 220 provides information indicating that the user is checked in for the course, information indicating that a questionnaire associated with the course is completed, information identifying a topic of the course, and information identifying a duration of the course. As shown by reference number 540, at a fourth time, cloud platform 220 provides user interface 540 based on determining that the course is completed and that the user is scheduled to attend lunch. In this case, cloud platform 220 provides information identifying a set of directions to lunch, a menu, or the like.

As further shown in FIG. 5, and by reference number 550, at a fifth time, cloud platform 220 provides user interface 550 based on determining that the user has finished activities at the connected learning center (e.g., attending the course, having lunch, etc.) and/or based on determining that the user has an upcoming flight reservation. In this case, cloud platform 220 provides an alert identifying the flight reservation and a set of directions to an airport associated with the flight reservation. As shown by reference number 560, at a sixth time, cloud platform 220 provides user interface 560 based on determining that the user has arrived at home (e.g., based on receiving location information relating to client device 210). In this case, cloud platform 220 provides information regarding a set of courses attended at the connected learning center, a set of course materials from the set of courses, a set of classmates in the set of courses, or the like.

As indicated above, FIG. 5 is provided merely as an example. Other examples are possible and may differ from what was described with regard to FIG. 5.

In this way, cloud platform 220 combines stored information relating to a connected learning center (e.g., training center information, course information, or user information) and/or sensor data (e.g., identifying locations of users in the connected learning center) to provide an user interface via a set of client devices 210, a set of display devices 260, or the like, thereby improving information management for the connected learning center. Moreover, cloud platform 220 automatically performs tasks, such as attendance collection, course registration, course scheduling, classroom testing, or the like, thereby saving class time for instruction and reducing costs relative to requiring the tasks to be performed manually by staff members. Furthermore, cloud platform 220 provides communication between multiple groups of users, such as via client devices utilized by remote users, users present at the connected learning center, and instructors of the courses provided at the connected learning center, or the like, thereby improving communication between each group of users relative to each group of users being isolated.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a memory; and
    one or more processors configured to:
        receive, from a plurality of sensors associated with a connected learning center, information regarding one or more client devices being utilized at the connected learning center;
        receive, from a first repository, information regarding one or more training courses associated with the connected learning center;
        receive, from a second repository, information regarding one or more users of the one or more client devices;
        generate, based on a training model, a customized user interface using the information regarding the one or more client devices, the information regarding the one or more training courses, and the information regarding the one or more users,
            the customized user interface being configured to provide, to a particular user, of the one or more users, of a particular client device, of the one or more client devices, information regarding a particular training course, of the one or more training courses, that the particular user is attending, and
            the customized user interface including either:
                a first set of particular modules according to the training model when the information regarding the one or more client devices, obtained by a particular sensor of the plurality of sensors, indicates that the particular client device is located within a classroom of the connected learning center in which the particular training course is being provided,
                    the first set of particular modules including a first chat functionality for a first subset, of the one or more users, that are located within the classroom, or
                a second set of particular modules according to the training model when the information regarding the one or more users indicates that the particular user is a remote attendee,
                    the second set of particular modules including a second chat functionality for a second subset, of the one or more users, that are remote attendees, and
                    the second set of particular modules being different from the first set of particular modules; and
        provide the customized user interface for display.

2. The device of claim 1, where the one or more processors are further configured to:
    receive, from a third repository, information regarding the plurality of sensors associated with the connected learning center,
        the information regarding the plurality of sensors indicating a location of the plurality of sensors; and
    determine that the particular client device is located within the classroom based on the information regarding the plurality of sensors.

3. The device of claim 1, where the one or more processors are further configured to:

determine, based on the information regarding the one or more client devices, that the particular client device is located within the classroom; and check the particular client device in to the particular training course based on determining that the particular client device is located within the classroom; and where the one or more processors, when generating the customized user interface, are configured to:
include, in the customized user interface, an updated class list indicating that the particular user of the particular client device is attending the particular training course based on checking the particular client device in to the particular training course.

4. The device of claim 1, where the one or more processors are further configured to:
determine, based on the information regarding the one or more client devices, that the particular user is located within a threshold proximity of a display device after the particular user is determined to be attending the particular training course;
determine, based on the information regarding the one or more users, that the particular user is to attend another training course in another classroom;
determine a set of wayfinding directions associated with directing the particular user to the other classroom; and
update the customized user interface to cause the display device to provide the set of wayfinding directions.

5. The device of claim 1, where the one or more processors are further configured to:
determine, based on the information regarding the one or more users, that the particular user is to attend another training course in another classroom; and
update the customized user interface to provide an alert indicating that the particular user is to attend the other training course in the other classroom.

6. The device of claim 1, where the one or more processors are further configured to:
select an advertisement for the one or more users based on the information regarding the one or more users; and
where the one or more processors, when generating the customized user interface, are to:
include the advertisement in the customized user interface.

7. The device of claim 1, were the one or more processors are further configured to:
select a course recommendation for the particular user based on the information regarding the one or more users,
the course recommendation relating to another training course,
a characteristic of the other training course, determined based on the information regarding the one or more training courses, corresponding to a preference of the particular user determined based on the information regarding the one or more users; and
where the one or more processors, when generating the customized user interface, are to:
include the course recommendation in the customized user interface.

8. A non-transitory computer-readable medium storing instructions, the instructions comprising:
one or more instructions that, when executed by one or more processors, cause the one or more processors to:
generate, based on a training model, a customized user interface based on information regarding a connected learning center, information regarding a set of courses at the connected learning center, and information regarding a set of users signed up for the set of courses,
the customized user interface being configured to provide, to a particular user, of the set of users, of a particular client device, of a plurality of client devices, information regarding a particular course, of the set of courses, that the particular user is attending, and
the customized user interface including either:
a first set of particular modules according to the training model when information regarding the plurality of client devices, obtained by one or more sensors, indicates that the particular client device is located within a classroom of the connected learning center in which the particular course is being provided,
the first set of particular modules including a first chat functionality for a first subset, of the set of users, that are located within the classroom, or
a second set of particular modules according to the training model when the information regarding the set of users indicates that the particular user is a remote attendee,
the second set of particular modules including a second chat functionality for a second subset, of the set of users, that are remote attendees, and
the second set of particular modules being different from the first set of particular modules;
provide, for display via the particular client device, the customized user interface;
detect that the particular client device is within a first threshold proximity to a display device of the connected learning center;
cause a portion of the information regarding the set of courses at the connected learning center to be provided for display via the display device,
the portion being selected based on user information regarding the particular user;
detect that the particular client device is within a second threshold proximity of the classroom; and
update one or more other customized user interfaces provided to one or more other client devices, of the plurality of client devices, used by one or more other users, of the set of users, based on detecting that the particular client device is within the second threshold proximity of the classroom.

9. The non-transitory computer-readable medium of claim 8, where the one or more instructions, when executed by the one or more processors, further cause the one or more processors to:
provide, via the one or more other customized user interfaces, information identifying one or more activities of the connected learning center,
the one or more activities including at least one of:
a dining activity,
a networking activity,
a classroom activity, or
a demonstration activity.

10. The non-transitory computer-readable medium of claim 8, where the one or more instructions, when executed by the one or more processors, further cause the one or more processors to:
cause a first set of wayfinding directions associated with a first route to be provided for display by a first display device, the first set of wayfinding directions indicating a set of directions to a first location,
the first location being determined based on user information regarding a first set of users; and
cause a second set of wayfinding directions associated with a second route to be provided for display by a second display device,
the second set of wayfinding directions indicating another set of directions to a second location,
the second set of wayfinding directions not intersecting with the first set of wayfinding directions, and
the second location being determined based on user information regarding a second set of users.

11. The non-transitory computer-readable medium of claim 8, where the one or more instructions, that cause the one or more processors to detect that the particular client device is within the second threshold proximity of the classroom, cause the one or more processors to:
receive the information regarding the plurality of client devices indicating that the particular client device is located within the classroom; and
where the one or more instructions, that cause the one or more other customized user interfaces, cause the one or more processors to:
update a class list document based on receiving the information regarding the plurality of client devices indicating that the particular client device is located within the classroom.

12. The non-transitory computer-readable medium of claim 8, where the one or more instructions, when executed by the one or more processors, further cause the one or more processors to:
obtain, based on detecting that the particular client device is within the second threshold proximity of the classroom, user information associated with the particular client device,
the user information including a user name and a password associated with a login to the particular client device;
utilize the user name and the password;
perform a verification to determine an identity of the particular user based on utilizing the user name and the password,
the verification permitting access to the particular user to the classroom or providing credit to the particular user for attending the particular course; and
update the customized user interface to provide information associated with classroom.

13. The non-transitory computer-readable medium of claim 8, where the one or more instructions, that cause the one or more processors to detect that the particular client device is within the second threshold proximity of the classroom, cause the one or more processors to:
receive the information regarding the plurality of client devices indicating that the particular client device is located within the classroom;
submit information identifying the particular user to a server associated with an accreditation body;
update the customized user interface to provide a notification indicating a quantity of credits that the particular user has completed; and
update a user interface of an instructor indicating that the particular user is taking the particular course for credit, the instructor being associated with the particular course.

14. A method, comprising:
receiving, by a device and from a plurality of sensors associated with a connected learning center, information regarding one or more client devices being utilized at the connected learning center;
receiving, by the device and from a first repository, information regarding one or more training courses associated with the connected learning center;
receiving, by the device and from a second repository, information regarding one or more users of the one or more client devices;
generating, by the device and based on a training model, a customized user interface using the information regarding the one or more client devices, the information regarding the one or more training courses, and the information regarding the one or more users,
the customized user interface being configured to provide, to a particular user, of the one or more users, of a particular client device, of the one or more client devices, information regarding a particular training course, of the one or more training courses, that the particular user is attending,
the customized user interface including either:
a first set of particular modules according to the training model when the information regarding the one or more client devices, obtained by a sensor of the plurality of sensors, indicates that the particular client device is located within a classroom of the connected learning center in which the particular training course is being provided,
the first set of particular modules including a first chat functionality for a first subset, of the one or more users, that are located within the classroom, or
a second set of particular modules according to the training model when the information regarding the one or more users indicates that the particular user is a remote attendee,
the second set of particular modules including a second chat functionality for a second subset, of the one or more users, that are remote attendees, and
the second set of particular modules being different from the first set of particular modules; and
providing, by the device, the customized user interface for display.

15. The method of claim 14, further comprising:
receiving, from a third repository, information regarding the plurality of sensors,
the information regarding the plurality of sensors indicating one or more locations of the plurality of sensors; and
determining that the particular client device is located within the classroom based on the information regarding the plurality of sensors.

16. The method of claim 14, further comprising:
determining, based on the information regarding the one or more client devices, that the particular client device is located within the classroom; and
checking the particular client device in to the particular training course based on determining that the particular client device is located within the classroom; and
where generating the customized user interface comprises:
including, in the customized user interface, an updated class list indicating that the particular user of the particular client device is attending the particular training course based on checking the particular client device in to the particular training course.

17. The method of claim 14, further comprising:
determining, based on the information regarding the one or more client devices, that the particular user is located within a threshold proximity of a display device after the particular user is determined to be attending the particular training course;
determining, based on the information regarding the one or more users, that the particular user is to attend another training course in another classroom;
determining a set of wayfinding directions associated with directing the particular user to the other classroom; and
updating the customized user interface to cause the display device to provide the set of wayfinding directions.

18. The method of claim 14, further comprising:
determining, based on the information regarding the one or more users, that the particular user is to attend another training course in another classroom; and
updating the customized user interface to provide an alert indicating that the particular user is to attend the other training course in the other classroom.

19. The method of claim 14, further comprising:
selecting an advertisement for the one or more users based on the information regarding the one or more users; and
where generating the customized user interface comprises:
including the advertisement in the customized user interface.

20. The method of claim 14, further comprising:
selecting a course recommendation for the particular user based on the information regarding the one or more users,
the course recommendation relating to another training course,
a characteristic of the other training course, determined based on the information regarding the one or more training courses, corresponding to a preference of the particular user determined based on the information regarding the one or more users; and
where generating the customized user interface comprises:
including the course recommendation in the customized user interface.

* * * * *